US012677988B2

(12) United States Patent
Wild et al.

(10) Patent No.: US 12,677,988 B2
(45) Date of Patent: Jul. 14, 2026

(54) FOOD PRODUCT POSITION AND RECOGNITION COOKING AND/OR HOLDING DEVICE SYSTEM UTILIZING PLURAL OPTICAL RECOGNITION SYSTEMS

(71) Applicant: Welbilt Deutschland GmbH, Eglfing (DE)

(72) Inventors: Hannes Wild, Riegsee (DE); Herbert Fischhaber, Peißenberg (DE)

(73) Assignee: Welbilt Deutschland GmbH, Eglfing (DE)

( * ) Notice: Subject to any disclaimer, the term of this patent is extended or adjusted under 35 U.S.C. 154(b) by 78 days.

(21) Appl. No.: 18/974,427

(22) Filed: Dec. 9, 2024

(65) Prior Publication Data

US 2025/0098896 A1 Mar. 27, 2025

Related U.S. Application Data

(62) Division of application No. 17/494,597, filed on Oct. 5, 2021, now abandoned.

(30) Foreign Application Priority Data

Oct. 7, 2020 (DE) .......................... 102020126249.3

(51) Int. Cl.
*A47J 36/00* (2006.01)
*A23L 5/10* (2016.01)
(Continued)

(52) U.S. Cl.
CPC ................. *A47J 36/32* (2013.01); *A23L 5/10* (2016.08); *A47J 27/14* (2013.01); *G06T 7/74* (2017.01);
(Continued)

(58) Field of Classification Search
CPC ... A47J 36/32; A47J 27/14; A23L 5/10; G06T 7/74; G06T 2207/20061;
(Continued)

(56) References Cited

U.S. PATENT DOCUMENTS

2003/0042303 A1 3/2003 Tsikos et al.
2007/0210055 A1* 9/2007 Konrad ................. A47J 39/006
219/386

(Continued)

FOREIGN PATENT DOCUMENTS

DE 202011002570 U1 5/2012
DE 102013102293 A1 9/2014
(Continued)

OTHER PUBLICATIONS

German Search Report dated Jul. 6, 2021 for German Appl. No. 102020126249.3.
(Continued)

*Primary Examiner* — Pakee Fang
(74) *Attorney, Agent, or Firm* — LOZA & LOZA, LLP; David S. Sarisky

(57) ABSTRACT

A cooking and/or heat retention appliance, in particular a commercial cooking appliance, comprising a housing in which an interior space is arranged having a cooking or interior space opening; an insert rack arranged in the interior space and includes a plurality of pairs of insert rails arranged one above the other for receiving one food product carrier each on insertion levels of different heights; and an optical recognition system arranged above the interior space opening and includes an image recording device, wherein the image recording device is connected to a separate evaluation device via a data line which, by an evaluation algorithm, determines the positioning of one or more food product carriers in the interior space and/or the positioning of at least (Continued)

one food product arranged on the food product carrier from the interior space image data recorded by the image recording device and transmitted to the evaluation device.

10 Claims, 15 Drawing Sheets

(51) Int. Cl.

| | |
|---|---|
| *A47J 27/14* | (2006.01) |
| *A47J 36/32* | (2006.01) |
| *G06T 7/73* | (2017.01) |
| *G06V 10/22* | (2022.01) |
| *G06V 20/00* | (2022.01) |
| *H04N 7/18* | (2006.01) |
| *F24C 15/16* | (2006.01) |
| *G06V 20/68* | (2022.01) |

(52) U.S. Cl.

CPC .............. *G06V 10/22* (2022.01); *G06V 20/00* (2022.01); *H04N 7/188* (2013.01); *A23V 2002/00* (2013.01); *F24C 15/16* (2013.01); *G06V 20/68* (2022.01)

(58) Field of Classification Search

CPC . G06T 2207/20084; G06T 2207/30128; G06T 7/73; G06V 10/22; G06V 20/00; G06V 20/68; G06V 10/82; H04N 7/188; H04N 7/183; A23V 2002/00; F24C 15/16; F24C 7/085

See application file for complete search history.

(56) References Cited

U.S. PATENT DOCUMENTS

| | | | |
|---|---|---|---|
| 2011/0083564 A1 | 4/2011 | Kirby et al. | |
| 2013/0302483 A1 | 11/2013 | Riefenstein | |
| 2014/0133698 A1 | 5/2014 | Fernandez et al. | |
| 2016/0296055 A1* | 10/2016 | Schilling | F24C 7/085 |
| 2017/0079471 A1* | 3/2017 | Riefenstein | H05B 6/6455 |
| 2017/0115008 A1* | 4/2017 | Erbe | F24C 7/081 |
| 2019/0285483 A1 | 9/2019 | Cheng | |
| 2020/0253415 A1 | 8/2020 | Stork Genannt Wersborg | |
| 2020/0267996 A1 | 8/2020 | Stork Genannt Wersborg et al. | |
| 2020/0297159 A1* | 9/2020 | Waitz | A47J 27/13 |
| 2024/0035666 A1* | 2/2024 | Koch | F24C 3/008 |

FOREIGN PATENT DOCUMENTS

| | | | |
|---|---|---|---|
| DE | 102013114227 A1 | 6/2015 | |
| DE | 102014210673 A1 | 12/2015 | |
| DE | 102016119230 A | 4/2018 | |
| EP | 2149755 A1 | 2/2010 | |
| WO | 2019210139 A1 | 10/2019 | |

OTHER PUBLICATIONS

European Search Report dated Apr. 19, 2022 for European Appl. No. 21201220.7.

European Search Report, European Patent Application No. 21201220.7, Aug. 18, 2022, 18 pgs.

European Office Action, European Patent Application No. 21201220.7, Sep. 6, 2023, 6 pgs.

European Office Action, European Patent Application No. 21201220.7, Jun. 26, 2024, 5 pgs.

European Search Report, European Patent Application No. 25191920.5, Nov. 3, 2025, 10 pgs.

* cited by examiner

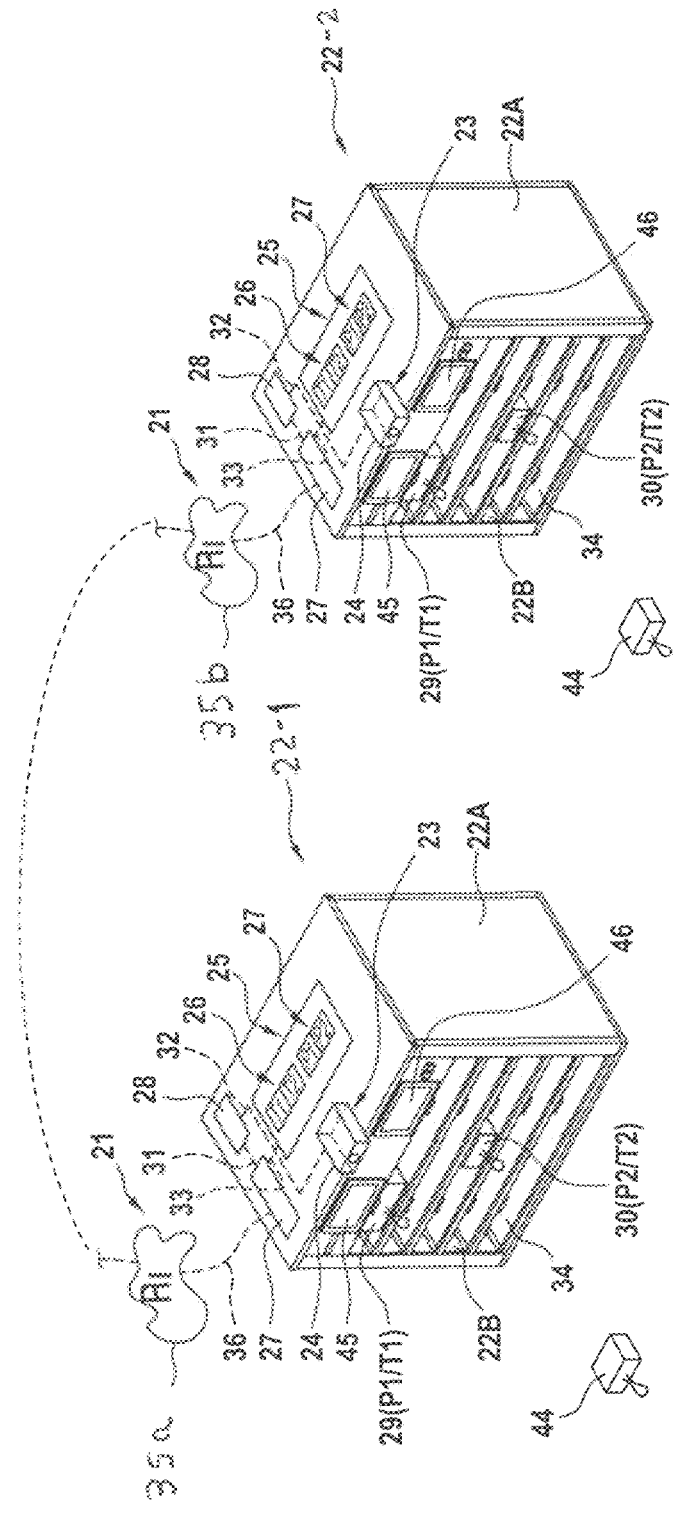
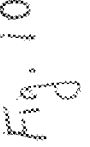
Fig. 10

FIG. 13

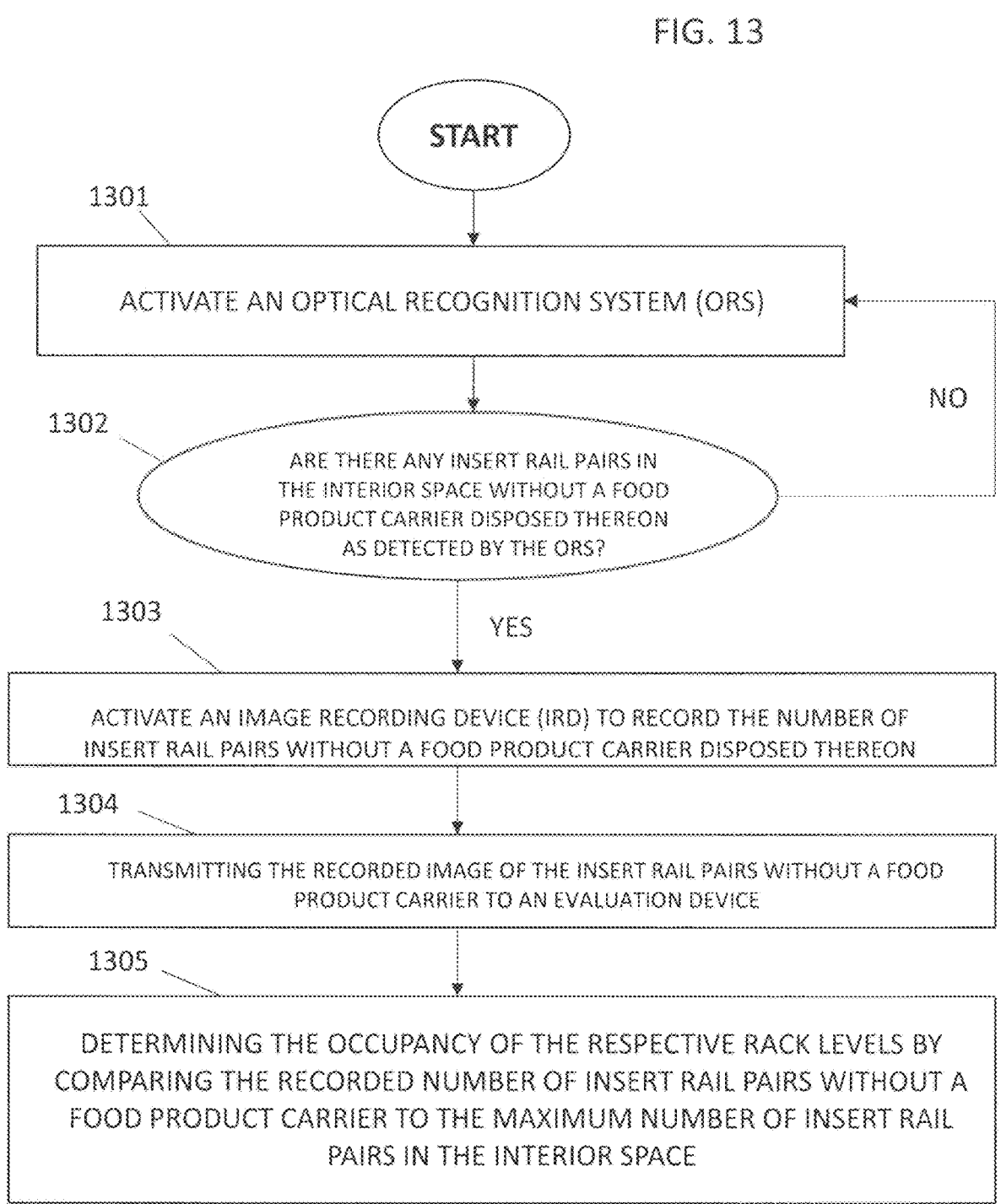

START

1301

ACTIVATE AN OPTICAL RECOGNITION SYSTEM (ORS)

NO

1302

ARE THERE ANY INSERT RAIL PAIRS IN THE INTERIOR SPACE WITHOUT A FOOD PRODUCT CARRIER DISPOSED THEREON AS DETECTED BY THE ORS?

1303

YES

ACTIVATE AN IMAGE RECORDING DEVICE (IRD) TO RECORD THE NUMBER OF INSERT RAIL PAIRS WITHOUT A FOOD PRODUCT CARRIER DISPOSED THEREON

1304

TRANSMITTING THE RECORDED IMAGE OF THE INSERT RAIL PAIRS WITHOUT A FOOD PRODUCT CARRIER TO AN EVALUATION DEVICE

1305

DETERMINING THE OCCUPANCY OF THE RESPECTIVE RACK LEVELS BY COMPARING THE RECORDED NUMBER OF INSERT RAIL PAIRS WITHOUT A FOOD PRODUCT CARRIER TO THE MAXIMUM NUMBER OF INSERT RAIL PAIRS IN THE INTERIOR SPACE

FIG. 14

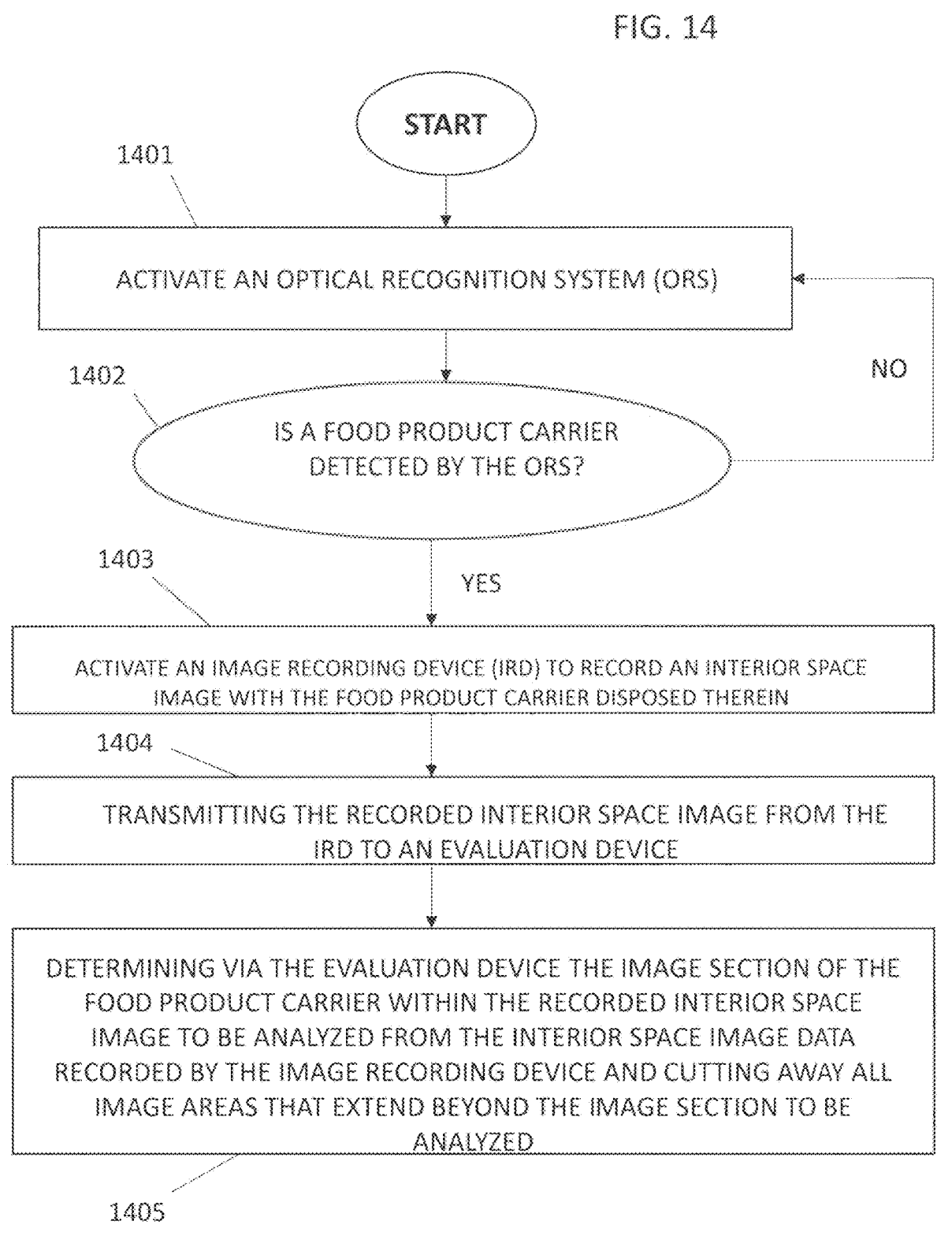

```
                      ┌─────────┐
                      │  START  │
                      └─────────┘
                           │
                           ▼
1401  ┌──────────────────────────────────────────────────┐
      │   ACTIVATE AN OPTICAL RECOGNITION SYSTEM (ORS)    │◄───┐
      └──────────────────────────────────────────────────┘    │
                           │                                   │
                           ▼                              NO   │
1402      ╱─────────────────────────────────╲                 │
         (    IS A FOOD PRODUCT CARRIER      )────────────────┘
          ╲   DETECTED BY THE ORS?          ╱
            ╲─────────────────────────────╱
                           │
                           │  YES
                           ▼
1403  ┌──────────────────────────────────────────────────┐
      │ ACTIVATE AN IMAGE RECORDING DEVICE (IRD) TO RECORD│
      │ AN INTERIOR SPACE IMAGE WITH THE FOOD PRODUCT     │
      │ CARRIER DISPOSED THEREIN                          │
      └──────────────────────────────────────────────────┘
                           │
1404                       ▼
      ┌──────────────────────────────────────────────────┐
      │ TRANSMITTING THE RECORDED INTERIOR SPACE IMAGE    │
      │ FROM THE IRD TO AN EVALUATION DEVICE              │
      └──────────────────────────────────────────────────┘
                           │
                           ▼
      ┌──────────────────────────────────────────────────┐
      │ DETERMINING VIA THE EVALUATION DEVICE THE IMAGE   │
      │ SECTION OF THE FOOD PRODUCT CARRIER WITHIN THE    │
      │ RECORDED INTERIOR SPACE IMAGE TO BE ANALYZED      │
      │ FROM THE INTERIOR SPACE IMAGE DATA RECORDED BY    │
      │ THE IMAGE RECORDING DEVICE AND CUTTING AWAY ALL   │
      │ IMAGE AREAS THAT EXTEND BEYOND THE IMAGE SECTION  │
      │ TO BE ANALYZED                                    │
      └──────────────────────────────────────────────────┘

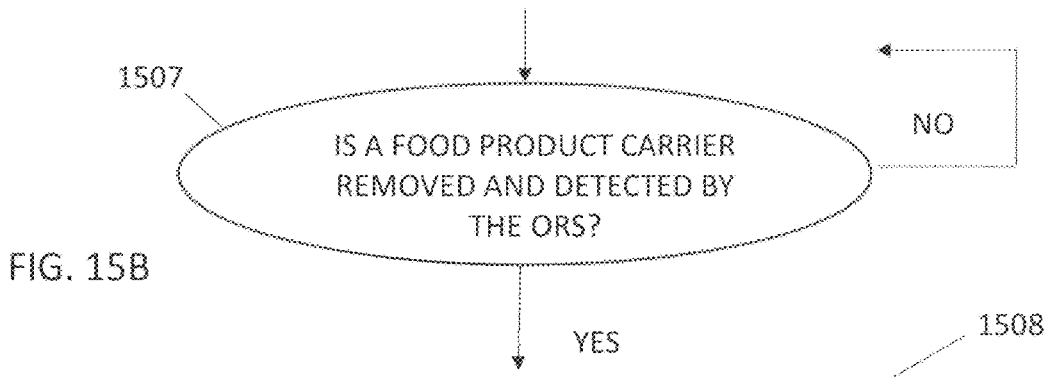

IS A FOOD PRODUCT CARRIER REMOVED AND DETECTED BY THE ORS?

NO

YES

1508

TRANSMITTING KEY INFORMATION OF THE FOOD PRODUCT/CARRIER FROM THE FOODSERVICE DEVICE A TO FOODSERVICE DEVICE B (e. g. food type, remaining count down time, shape/pattern of food time inside carrier, ....)

1509

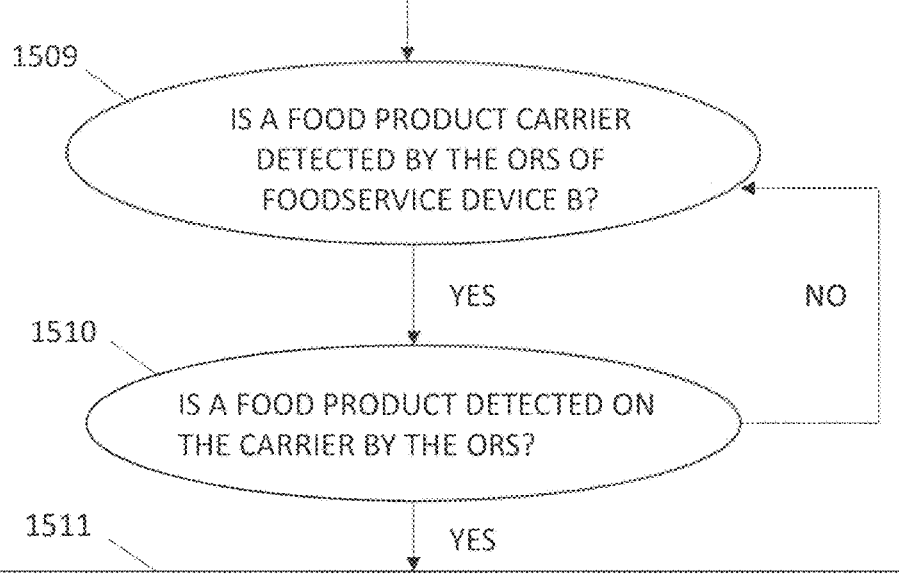

IS A FOOD PRODUCT CARRIER DETECTED BY THE ORS OF FOODSERVICE DEVICE B?

YES                NO

1510

IS A FOOD PRODUCT DETECTED ON THE CARRIER BY THE ORS?

1511                YES

ACTIVATE AN IMAGE RECORDING DEVICE (IRD) TO RECORD AN IMAGE OF THE DETECTED FOOD PRODUCT WITHIN AN INTERIOR SPACE AND COMPARE WITH KEY INFORMATION RECEIVED FROM FOODSERVICE DEVICE A

1512

DETERMINING THE POSITION, i.e., INSERTION LEVEL, OF THE FOOD PRODUCT ON THE CARRIER BY COMPARING THE RECORDED FOOD PRODUCT IMAGE FROM THE IRD TO THE PREVIOUSLY STORED FORM, SHAPE AND/OR DIMENSION OF A KNOWN FOOD PRODUCT AND ACTIVATE A REMAINING TIMER THAT IS DISPLAYED ON AN USER INTERFACE OF FOODSERVICE DEVICE B IF THE KEY INFORMATION THAT WAS RECEIVED FROM FOODSERVICE DEVICE A IS MATCHING.....

FOOD PRODUCT POSITION AND RECOGNITION COOKING AND/OR HOLDING DEVICE SYSTEM UTILIZING PLURAL OPTICAL RECOGNITION SYSTEMS

CROSS-REFERENCE TO RELATED APPLICATIONS

This application is a divisional of U.S. application Ser. No. 17/494,597, filed on Oct. 5, 2021, entitled "Food Product Position and Recognition Cooking and/or Holding Device System," which claims priority to German Patent Application No. 102020126249.3, filed on Oct. 7, 2020, each of which is incorporated herein by reference in its entirety.

BACKGROUND

The present disclosure relates to a cooking appliance, in particular in the form of commercial cooking and/or holding devices which comprise an optical recognition system, image recording device and an evaluation device which utilizes an evaluation algorithm to determine the positioning of one or more food product carriers in the cooking or holding chamber or space and/or the positioning of at least one food product arranged on the food product carrier or tray from previously stored image data concerning the carrier and/or the form or dimension of the food product, thereby enabling the controller of the cooking and/or holding device or appliances to preferably recognize when mixed or rolling loads of food products are placed in the cooking and/or holding device(s) and to determine the precise location, i.e., level, of each food product and carrier or tray within the cooking or holding chamber or interior space, thereby enabling the controller to run different cooking recipe parameters at different locations, i.e., shelves, within the cooking chamber or interior space, or to determine when a particular food product carrier should be removed from the chamber, thereby ensuring the proper cooking or holding time of each particular food product on the respective food product carriers.

Such a cooking appliance is known from DE 10 2016 119 230 A1 and comprises a housing in which a cooking space is arranged having a cooking space opening. This cooking space opening can be released by opening a cooking space door or covered by closing the cooking space door, so that the cooking space is made accessible when opening the cooking space door, while it is closed when closing the cooking space door.

An insert rack is arranged in the cooking space including a plurality of pairs of insert rails arranged one above the other, wherein a food product carrier can be inserted into each pair of the insert rails. This results in at least one, but usually several insertion levels at different height levels.

The cooking appliance of the generic kind further comprises a recognition system which is arranged above the cooking space opening and includes an image recording device, in particular in the form of a camera. Since this camera is in signal connection with a control unit of the cooking appliance and this control unit performs the image processing by means of an evaluation algorithm in the control unit and for this purpose, as known data, the size of the detection area, the size of the baking sleeve, the size of the food support and the edge area of the food support and the resolution of the image must be entered into the control unit, this modification of the control unit results in a high technical effort, although a camera is used as the image recording device in the generic cooking device including a lens with a fixed focus.

It is therefore an object of the present disclosure to provide a cooking appliance, in particular in the form of a commercial cooking appliance, of the kind indicated in the preamble of claim 1, whose recognition system is technically simpler and thus more cost-effective to set up.

SUMMARY

The cooking appliance according to the disclosure comprises an optical recognition system, whose image recording device is connected to a separate evaluation device via a data line. The evaluation device can use the cooking space image data recorded by the image recording device and transmitted to the evaluation device to determine the positioning of one or more food product carriers in the interior or cooking space of the foodservice device or equipment, or the spatial positioning within a foodservice device or equipment, e.g., cooking appliance, in particular a heat-retention device (e.g., a holding cabinet), and the positioning of at least one food product arranged on a food product carrier, respectively. Here, the term "spatial positioning" in a foodservice device, e.g., a cooking appliance, refers in particular to the horizontal and vertical insertion position.

This takes advantage of the fact that the size and shape of the food product carriers, the number of insert rails and, thus, the number of insertion levels, and the distances between the insertion levels, as well as the shape and size of different food products, are known variables that can be entered as basic data in the separate evaluation unit, whereas the appliance control does not have to be programmed in a complex manner with the data required for image processing and an evaluation algorithm, as is necessary in the case of the cooking appliance of the generic kind. That is, the present disclosure provides the evaluation unit with the necessary location of the food product carrier and the type of food product disposed on each respective carrier, thereby enabling the evaluation unit to provide such information to the controller such that it can provide different recipe parameters to the cooking appliance to uniquely enable it to operate the appliance such that it can cook the various food products in a mixed load cooking chamber based upon its specific cooking recipe at the same time.

The location of the carrier or tray and the food product disposed on the carrier is an important piece of information when utilizing product recognition technology to automatically set the cooking recipe parameters in any cooking appliance. This is particularly true when the cooking appliance is asked to simultaneously cook a mix of different food products at the same or substantially the same time. The controller stores each carrier's position or location, food product disposed thereon, and cook or hold time remaining pertaining to each carrier for the particular food product disposed thereon.

If a customer is using the cooking appliance in a "rolling load" mode, the same of different types of food product will be inserted and removed continuously from the cooking or holding chambers. For examples, if two food product carriers or trays with chicken are inside the cooking chamber or oven, it is critical to know which carrier or tray is ready for unloading and which is required to remain in the cooking chamber, e.g., interior space, to complete the pre-set cooking process.

Regarding the location of the food items on the carrier, some end users are placing to many items on the carrier or tray. This results in uneven cooking of the food items. The present disclosure is capable of alerting the user that the food items need to be more evenly distributed on the carrier or tray, so that the hot air can stream around the items.

Furthermore, it can be taken into account that in the case of a plurality of insertion levels, a change in the edge lengths of the food product carriers detected by the image recording device occurs in dependance on the distance from the image recording device, which is reflected in the recorded image data, so that the evaluation device can determine, for example, the insertion level on which a food product carrier has been arranged from the previously entered data and the recorded image data.

Such a determination of the insertion level can also be carried out by comparing the product size recorded by the image recording device with the known actual product size, since a food product located closer to the image recording device is recorded as being larger than a food product located further away from the image recording device in the cooking space. These size differences can be transmitted as image data to the evaluation device, which uses a comparison unit to compare the actual size of the cooked product as a preset parameter with the recorded image data of the food products arranged in the cooking space and can determine the relevant insertion level. Here should be mentioned that due to the increase in the degree of industrialization of food production, the size and shape of a specific food product is standardized to a large extent. An exemplary baked product, such as a commercially available Kaiser-roll, has a fixed size and outer geometry.

Alternatively, it is possible for the image recording device to record the number of insert rail pairs not provided with food product carriers, which are then transmitted as image data to the evaluation device, which in turn can determine the occupancy of the respective rack levels in its comparison unit by comparing the recorded number of unloaded insert rail pairs with the total number of insert rail pairs present.

The disclosure also relates to a cooking appliance which is also characterized in that the image recording device is connected via a data line to a separate evaluation device which can determine the image section to be analyzed from the cooking or interior space image data recorded by the image recording device and transmitted to the evaluation device.

For this is used that the image recording device, in particular in the form of a camera with fixed optics and thus fixed focal length, always captures a standard area, usually a circular area of a capture cone of the camera. The image recorded by the image recording device in the form of the standard area falls on the sensor area of an image sensor (e.g., CCD sensor), the sensor area of this image sensor usually being a square or a rectangle. In this way, areas beyond the sensor area that do not need to be evaluated are cut away from the image sensor. The resulting image is transmitted to the evaluation device, which, on the basis of the insertion position of the food product carrier known to it, cuts away all image areas that extend beyond the image area actually to be analyzed, on which, for example, a food product is arranged, so that only the actually relevant image section remains for the evaluation device, which must be considered with regard to food product to be analyzed. Since the number of pixels of the commonly used image sensors is extremely high anyway, the remaining image area to be analyzed has such a high number of pixels that also a high resolution is possible, which ensures a high analysis quality, but on the other hand can advantageously considerably reduce the computing power to be provided by the evaluation device, since only the image area that is actually relevant for the desired analysis result is analyzed. As explained above, an image recording device, in particular in the form of a camera, with fixed optics and thus a fixed focal length, is advantageously used for this embodiment of the cooking device according to the disclosure.

For example, the CCD sensor mentioned above is used as the image sensor.

A method for determining a position of a food product carrier in a foodservice device comprising: activating an optical recognition system; determining if the food product carrier is detected by the optical recognition system; if the food product carrier is detected by the optical recognition system, activating an image recording device to record an interior space of the foodservice device with the food product carrier disposed therein; transmitting the recorded interior space image from the image recording device to an evaluation device; and determining via the evaluation device the position of the food product carrier in the interior space, or the spatial positioning within the interior space.

The spatial positioning within the interior space is determined by either (1) a fixed focal length of the image recording device, and/or (2) an edge length of the food product carrier.

A method for determining a position of a food product on a carrier in a foodservice device comprising: activating an optical recognition system; determining if the food product carrier is detected by the optical recognition system; if the food product carrier is detected by the optical recognition system, determining if a food product is on the food product carrier by the optical recognition system; if the food product is detected on the food product carrier by the optical recognition system, then activating an image recording device to record an image of the detected food product within the interior space; transmitting the recorded food product image from the image recording device to an evaluation device; and determining the position of the food product on the food product carrier by comparing the recorded food product image from the image recording device to a previously stored food product.

A method for determining the occupancy of rack levels in a foodservice device comprising: activating an optical recognition system; detecting by the optical recognition system if there are any insert rail pairs in an interior space of the foodservice device without a food product carrier disposed thereon; if there are any insert rail pairs without a food product carrier disposed thereon, then activating an image recording device to record the number of insert rail pairs without the food product carrier disposed thereon; transmitting a recorded image of the insert rail pairs without a food product carrier to an evaluation device; and determining the occupancy of the respective rack levels by comparing the recorded number of the insert rail pairs without a food product carrier to the maximum number of the insert rail pairs in the interior space.

A method for minimizing an image section of a food product carrier which is to be analyzed comprising: activating an optical recognition system; determining if the food product carrier is detected by the optical recognition system; if the food product carrier is detected by the optical recognition system, then activating an image recording device to record an image of an interior space of a foodservice device with the food product carrier disposed therein; transmitting the recorded image of the interior space from the image recording device to an evaluation device; determining via the evaluation device an image section of the food product carrier within the recorded image of the interior space to be

5 analyzed from the food product space image data recorded by the image recording device; and cutting away all image areas that extend beyond the image section to be analyzed.

A method for transferring a food product carrier between at least a first foodservice device and a second foodservice device, which method comprises: activating a first optical recognition system for a first foodservice device; detecting by the first optical recognition system if a food product carrier is in the first foodservice device; if the first optical recognition system detects that the food product carrier is in the first foodservice device, detecting by the first optical recognition system if a food product is on the food product carrier; if the food product is detected on the food product carrier, activating an image recording device to record an image of the detected food product within an interior space of the first foodservice device; transmitting the recorded food product image from the image recording device to an evaluation device; determining the position of the food product on the food product carrier by comparing the recorded food product image to a previously stored known food product; activating a first timer regarding the food product in the first foodservice device; detecting if the food product carrier is removed from the first foodservice device; if the food product carrier is removed from the first food-service device, transmitting information pertaining to the food product and the food product carrier from the first foodservice device to the second foodservice device; detecting by a second optical recognition system if the food product carrier has been received by the second foodservice device; if the food product carrier has been received by the second foodservice device, detecting if the food product is on the food product carrier which was detected by the second optical recognition system; activating an image recording device to record an image of the detected food product on the food product carrier in the second foodservice device; comparing the information transmitted from the first foodservice device with information received by the second foodservice device; determining the position of the food product on the food product carrier by comparing the recorded food product image from a previously stored food product; and activating a remaining timer on the second foodservice device if the information that was transmitted from first foodservice device matches the information received by the second foodservice device.

BRIEF DESCRIPTION OF THE DRAWINGS

Further details, advantages and features of the disclosure will be apparent from the following description of the drawing. It shows.

Figure 7:
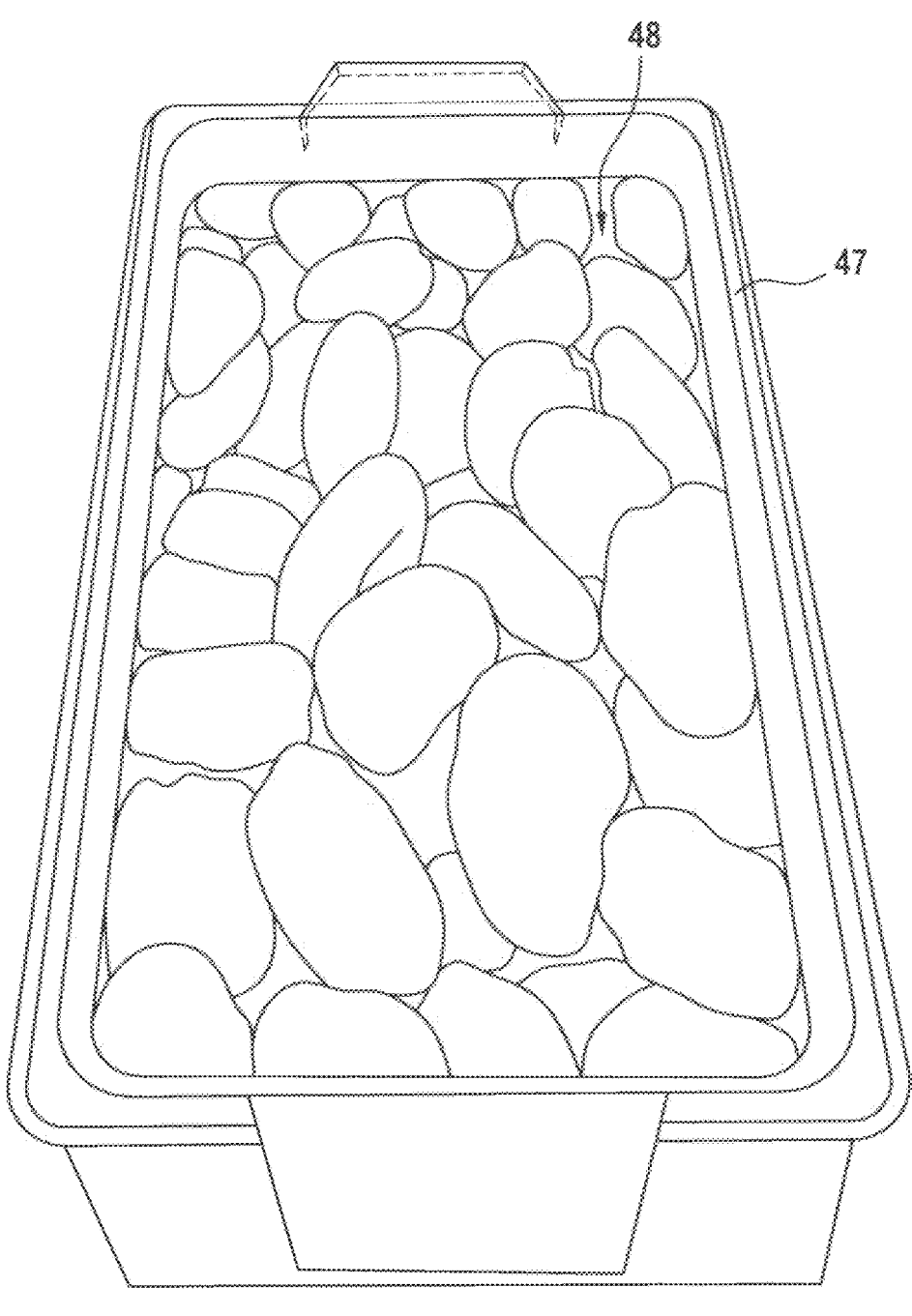
Figure 8:
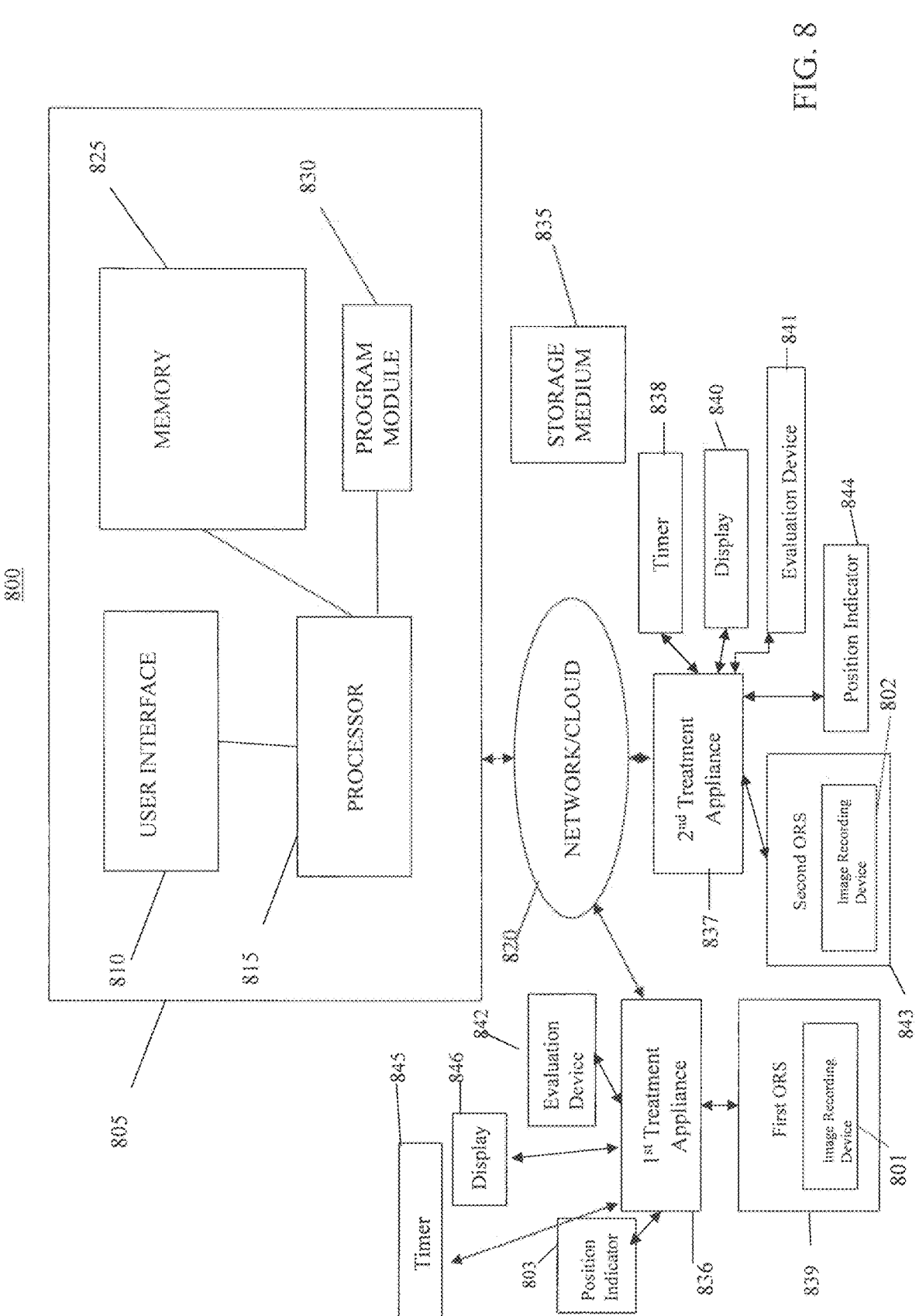
Figure 9:
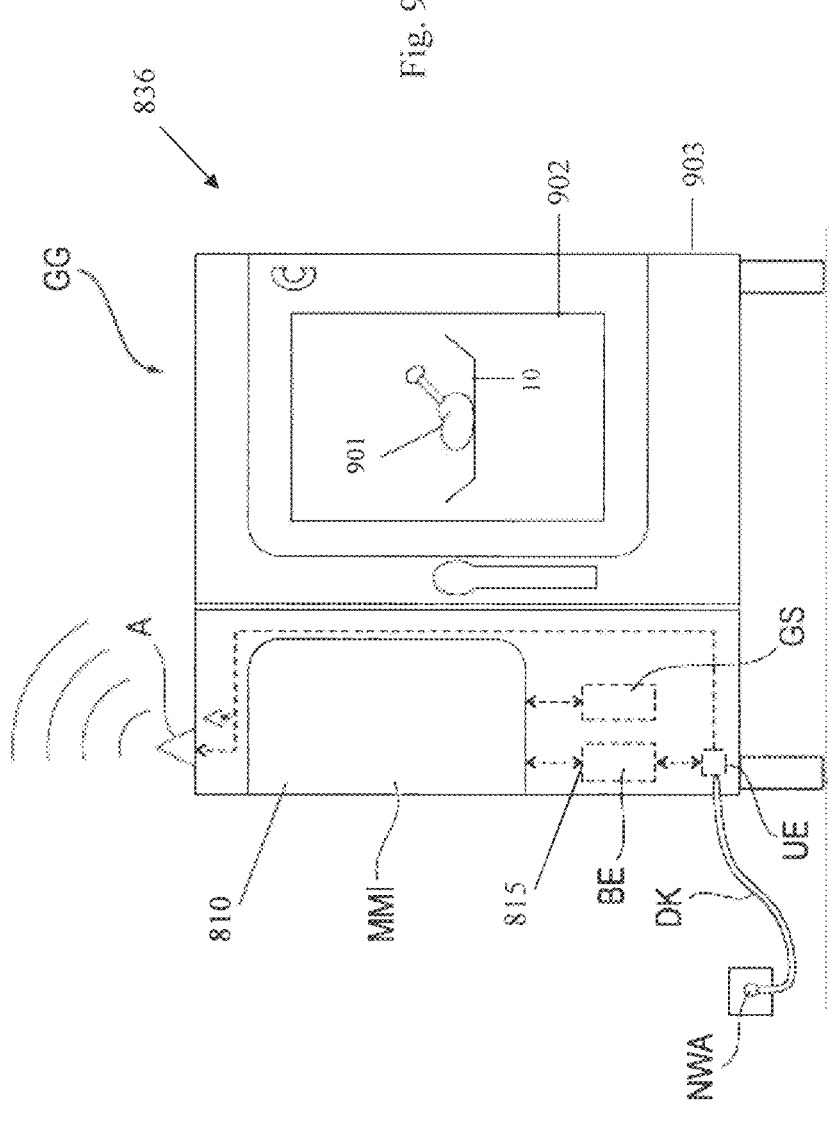
Figure 11:
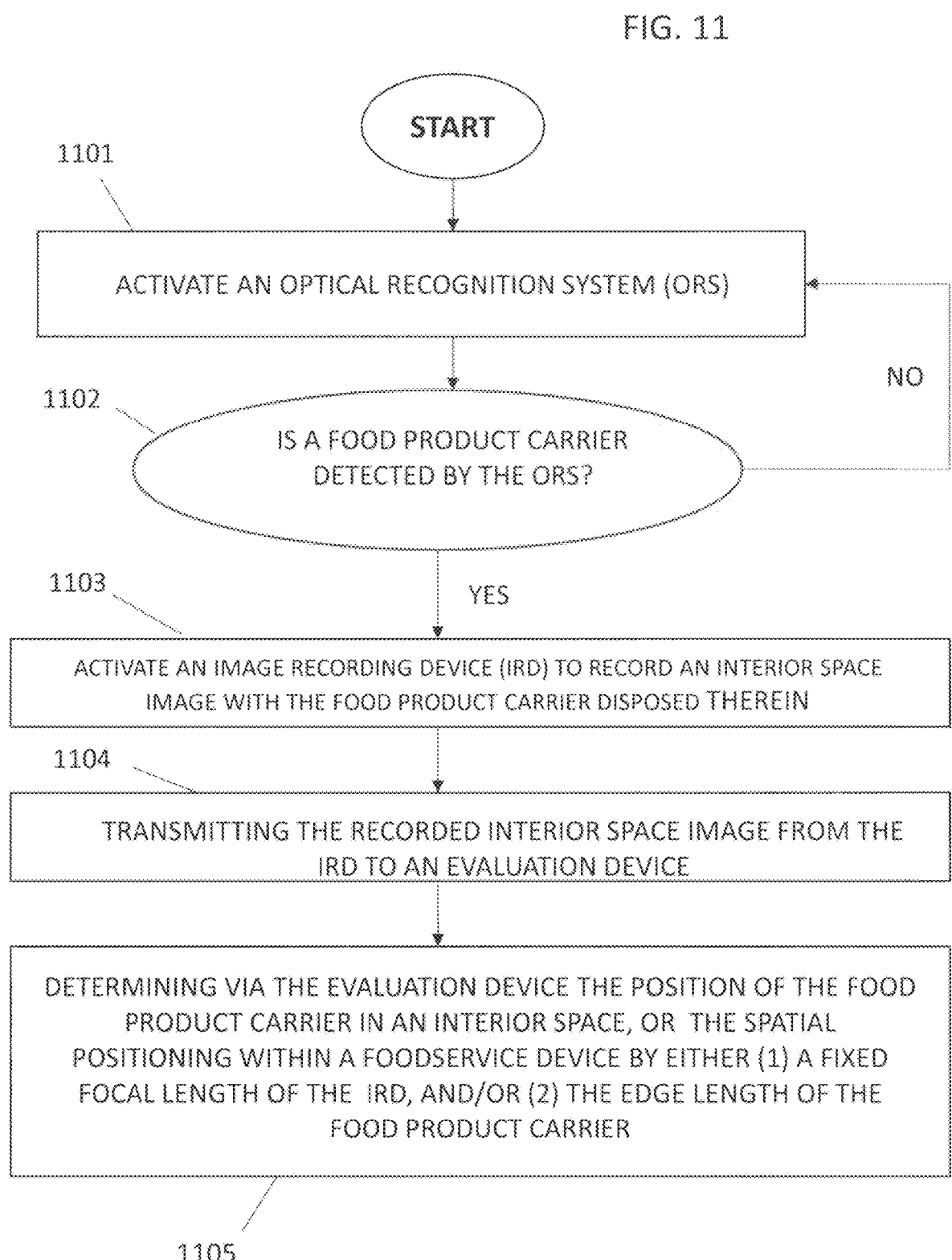
Figure 12:
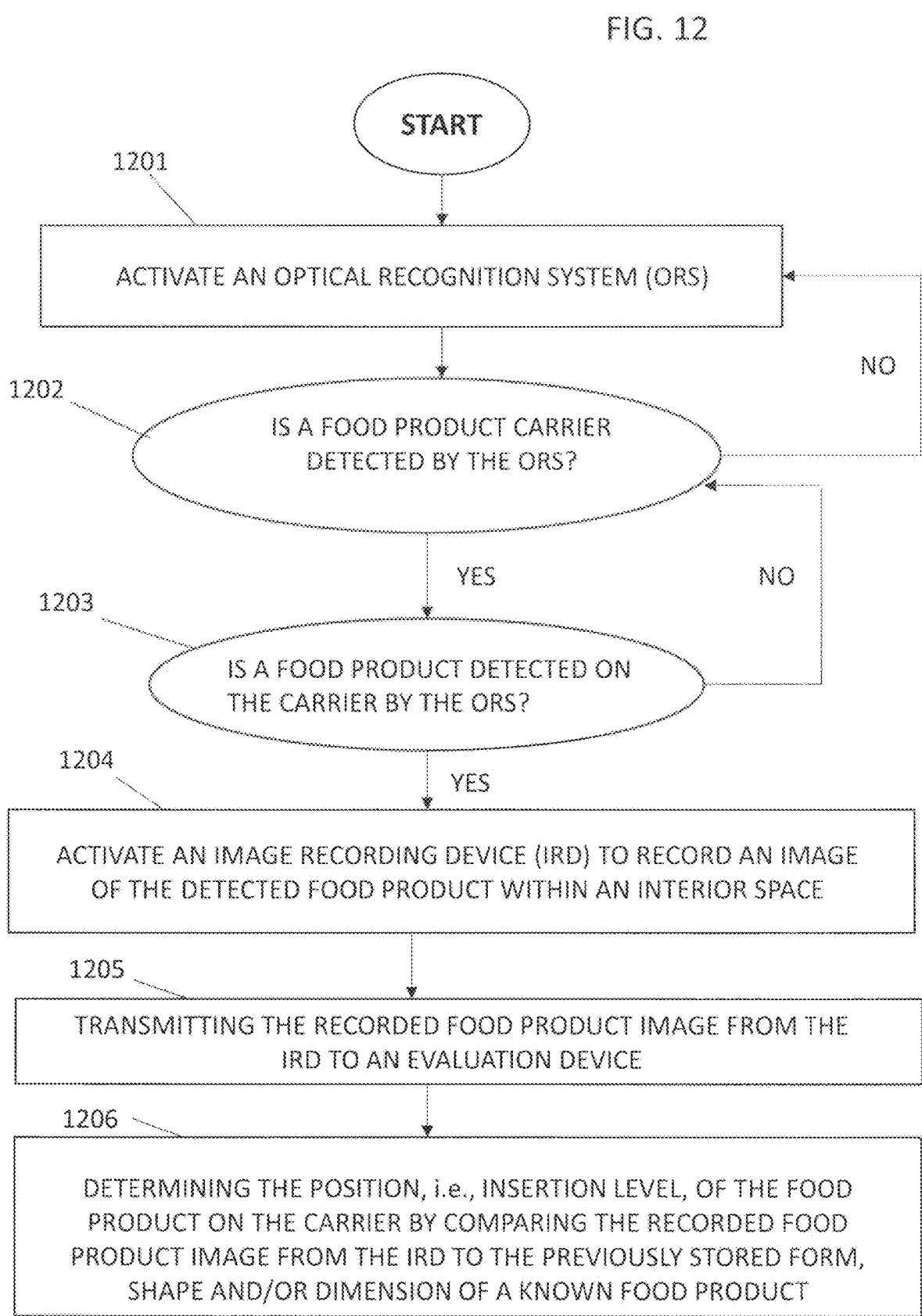
Figure 15:
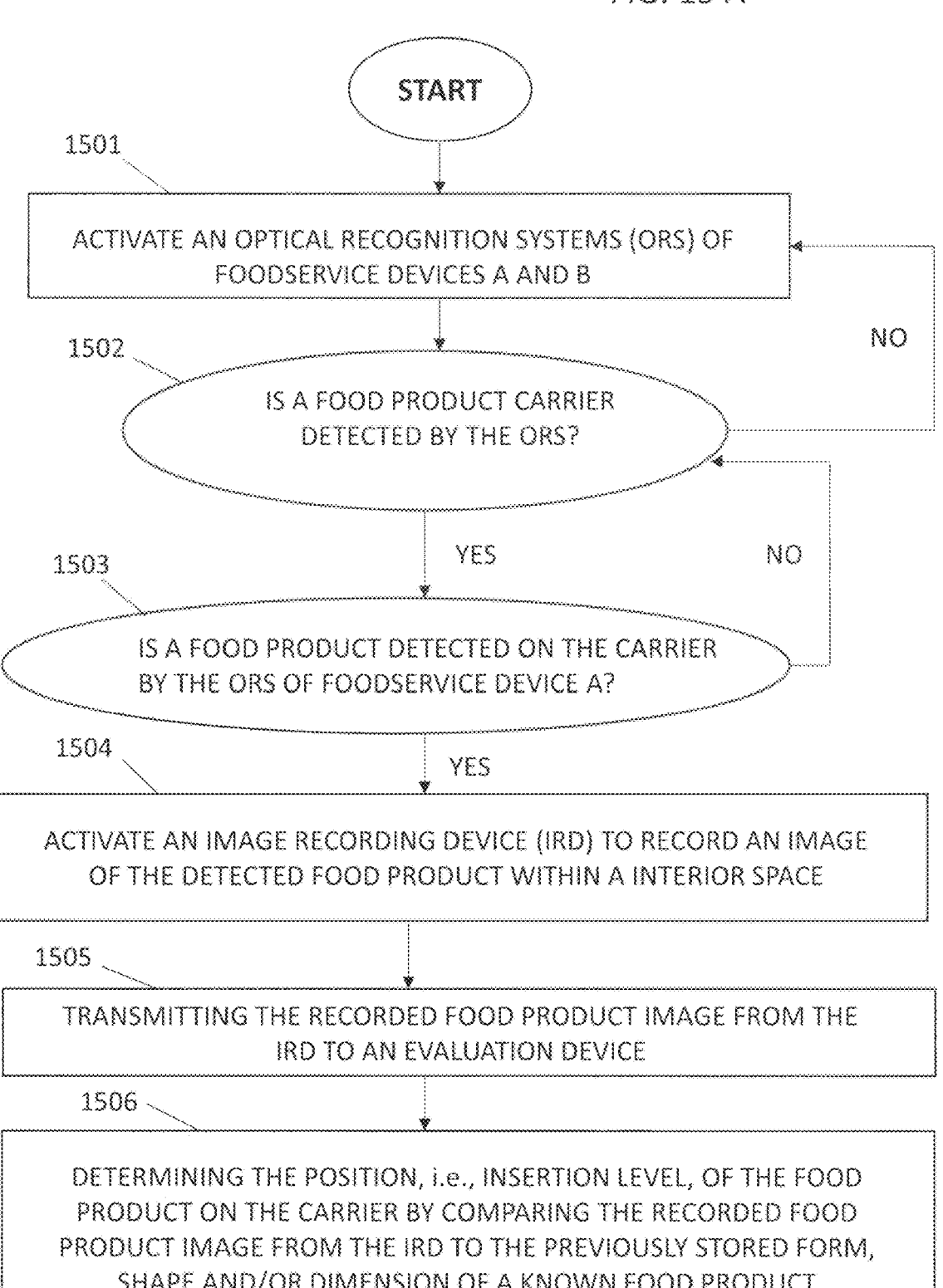

6 calculation of the insertion positions of food product carriers in the interior of a foodservice device, FIG. 7 a top view of a filled food product carrier, FIG. 8 is a block diagram depicting the system according to the present disclosure with first and second foodservice devices, FIG. 9 is a front planar view of a cooking appliance according to the present disclosure, FIG. 10 is a pair of heat retention or holding cabinet systems which communicate with each other when at least one food product carrier is moved from a first foodservice device to a second foodservice device, FIG. 11 is a logic diagram according to the present disclosure which determines the position of a food product carrier by either (1) a fixed focal length or an image recording device, and/or (2) the edge length of the food product carrier, FIG. 12 is a logic diagram according to the present disclosure which determines the position, i.e., insertion level, of the food product on the carrier by comparing the recorded food product image from the image recording device to a previously stored image, shape and/or dimension of a known food product, FIG. 13 is logic diagram according to the present disclosure which determines the occupancy of the respective rack levels by comparing the recorded number of insert rail pairs without a carrier disposed therebetween to the maximum number of insert rail pairs in the interior space or cabinet, FIG. 14 is a logic diagram according to the present disclosure which determined via the evaluation device the image section of the food product carrier within the interior space image to be analyzed from the interior space image data recorded by the image recording device and cutting away all image areas that extend beyond the image section to be analyzed, and FIGS. 15A and B is a logic diagram according to the present disclosure which determines (a) the position, i.e., insertion level, of the food product on the carrier and activates a timer that is displayed on a user interface of foodservice device A, (b) upon detecting that the food product carrier is removed from foodservice device A, transmitting key information pertaining to the food product/carrier from foodservice device A to foodservice device B, including, but not limited to, food type, remaining count down time, shape/pattern of food time, etc., and (c) determining the position, i.e., insertion level, of the food product on the carrier by comparing the recorded food product image from the image recording device to the previously stored form, shape and/or dimensions of a known food product and activate a remaining timer if the key information transmitted from foodservice device A matches the key information detected in foodservice device B.

DETAILED DESCRIPTION

Before discussing the principles of the present disclosure in detail, it should be emphasized that, in the context of the present application, the term "cooking appliance" is understood to include commercial cooking devices as well as household cooking devices and, more generally, food processing devices that can perform both cold and hot treatment of food products and may include, for example, hot air steamers, combi steamers, beverage dispensers, beverage mixers, microwave ovens and other foodservice devices.

Figure 1:
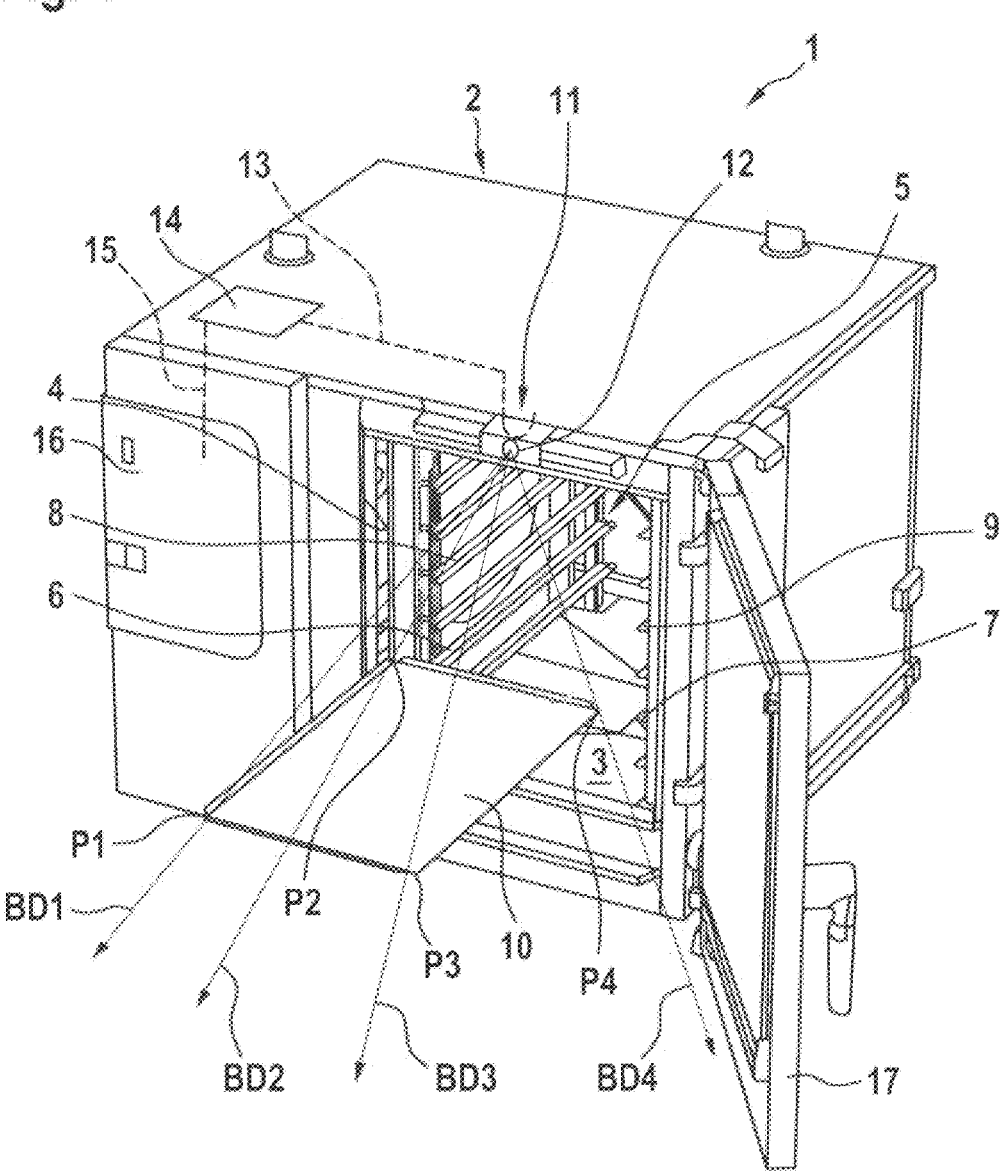
FIG. 1 a schematic, slightly simplified perspective view of a cooking appliance according to the disclosure, in particular in the form of a commercial cooking appliance, FIG. 2 a top view of a part of the cooking appliance according to FIG. 1, FIG. 3 a schematically greatly simplified principal diagram of the cooking appliance according to the disclosure, FIG. 4 a schematically greatly simplified diagram to explain the evaluation principles of the second embodiment of the cooking appliance according to the disclosure, FIG. 5A, 5B perspective, schematically slightly simplified diagrams of a first foodservice treatment or cooking device and a second foodservice treatment or heat retention/holding device which form an integrated system, FIG. 6 a schematically simplified principal diagram for determining geometric variables required for trigonometric
Figure 2:
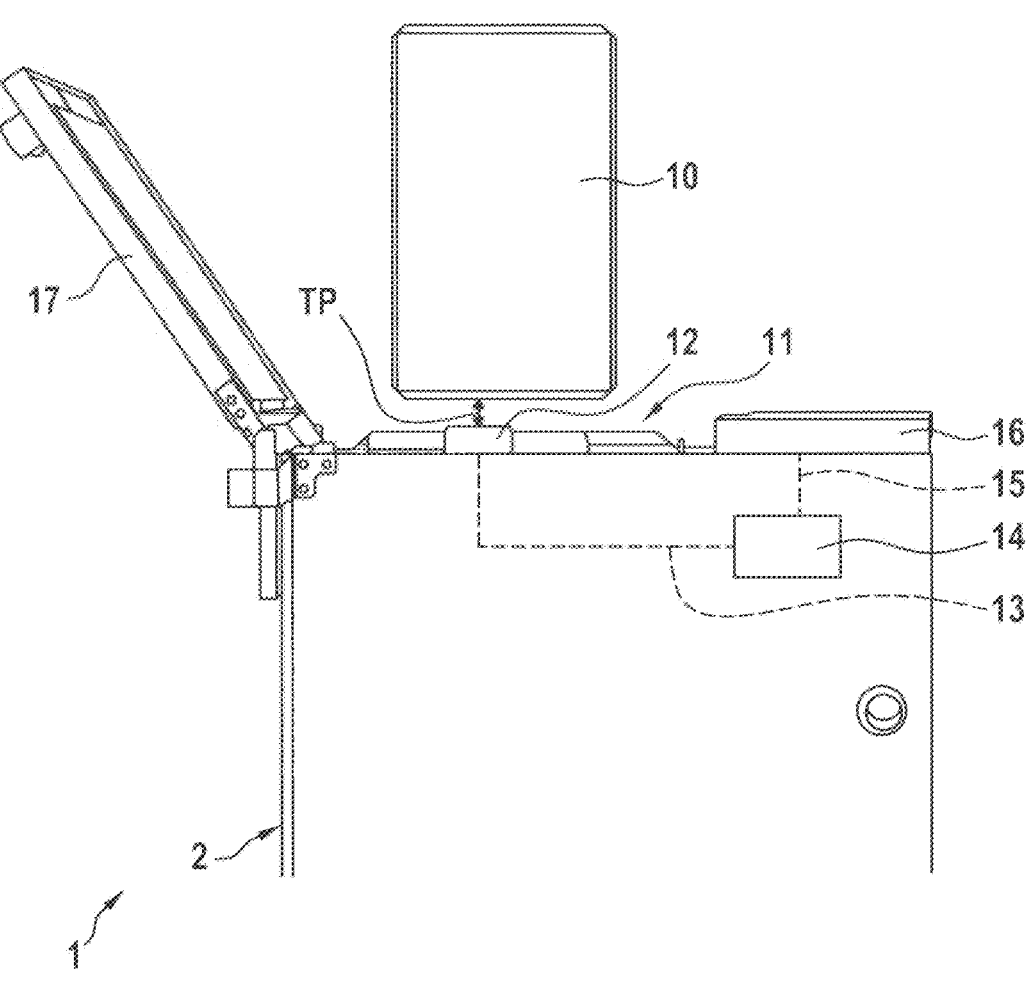
Figure 3:
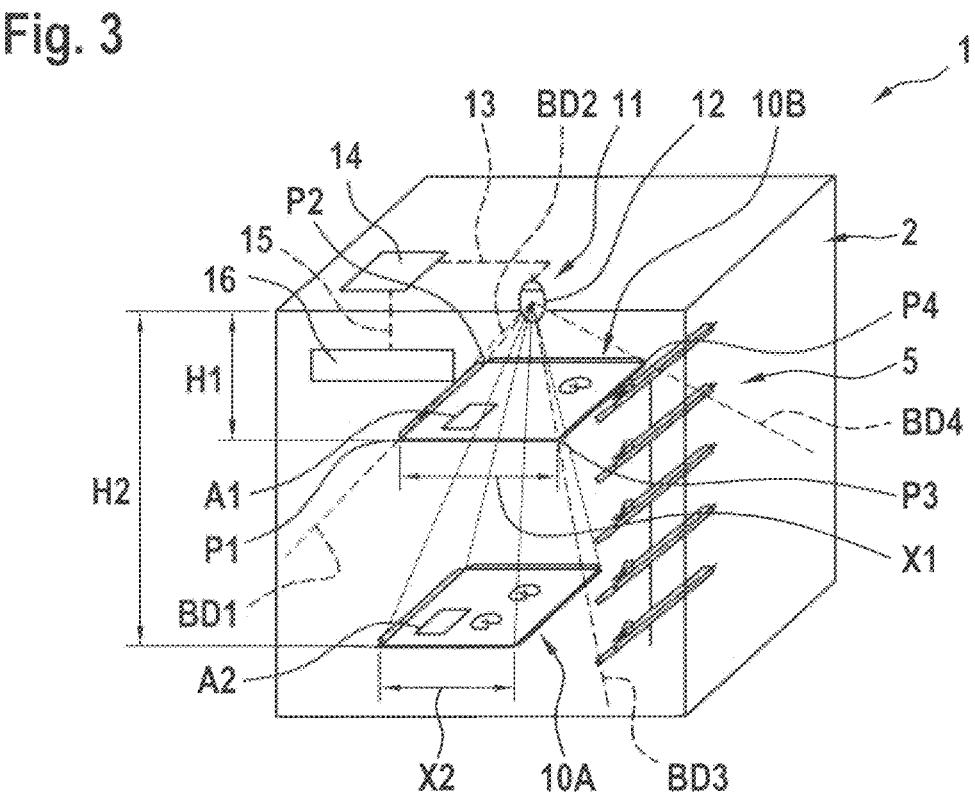

A combination of FIGS. 1, 2 and 3 results in the structure and operation of a cooking appliance 1 according to the disclosure, which in particular can be designed as a commercial cooking appliance.

The cooking appliance 1 comprises a housing 2, in which a cooking space 3 is arranged having an internal space or cabinet opening 4.

An insert rack 5 is arranged in the cooking space 3. In the example shown, this insert rack 5 includes a plurality of pairs of insert rails arranged one above the other, whose pairs 6, 7 and 8, 9 are identified by reference signs as representative of all pairs. These pairs of insert rails each serve to accommodate a food product carrier 10 on insertion levels of different heights, which in FIG. 3 are symbolized by the height values H1 and H2. At a minimum, one food product carrier 10 is inserted into the cooking spacer 3, however, it is also possible that the maximum number of food product carriers 10 defined by the number of insert rail pairs can be arranged in the cooking space 3. For practical reasons (easier handling, weight), the food product carriers are inserted one after the other so that the food product carriers are not covered during a loading process.

Furthermore, FIGS. 1 and 2 in particular illustrate the arrangement of an optical recognition system 11 which is arranged above the cooking space opening 4. The recognition system 11 includes an image recording device 12, which can be designed in particular in the form of a camera, preferably with a fixed focal length.

According to the disclosure, the image recording device 12 is connected via a data line 13 to an evaluation device 14, which is shown schematically in a greatly simplified manner. Image data, symbolized in FIG. 1 by the arrows BD1 to BD4, which are recorded by the image recording device 12, are transmitted to this evaluation device 14. As explained above, the evaluation device 14 can determine the positioning of one or more food product carriers 10 in the cooking space 3 from these transmitted cooking space image data BD1 to BD4.

The image data BD1, BD2, BD3 and BD4 recorded by the image recording device 12 result in the example shown from the arrows symbolizing these image data, which extend from the image recording device 12 to corner points P1, P2, P3 and P4 of the rectangular food product carrier 10 in the example and symbolize the image section which results from projecting the image of the food product carrier 10 recorded by the image recording device 12 onto an image sensor not shown in detail in the figures.

It should also be noted that the cooking appliance 1 according to the disclosure can include a cooking space door 17, which is shown in FIG. 1 in the open state, in which a food product carrier 10 can be inserted into the cooking space 3.

Furthermore, the cooking appliance 1 includes a cooking appliance control 16 which is connected to the evaluation device 14 via a second data line 15 in order, among others, to enable the cooking device 1 to be controlled or regulated in accordance with the data supplied by the evaluation device 14.

FIG. 3 again shows the image data arrows BD1 to BD4, which are intended to illustrate that in the recorded image the edge length X1 of the upper food product carrier 10B here is greater than the edge length X2 of the lower food product carrier 10A, which enables the evaluation device 14 to determine the insertion levels symbolized by the heights H1, H2. Just for the sake of completeness, it should be noted that the lower food product carrier 10A can of course only be detected if the upper food product carrier 10B is not inserted.

FIG. 3 further illustrates that it is also possible for the image capturing device 12 to determine the insert rail pairs of the insert rack 5 that are not covered by an inserted food product carrier, which enables the evaluation device 14 to determine the insertion levels H1 and H2 by comparing the detected free insert rail pairs with the total number of insert rail pairs of the insert rack 5.

With regard to the second previously explained embodiment of the cooking appliance 1 according to the disclosure, reference can be made to the preceding description of FIGS. 1 and 2 with regard to its components, wherein FIG. 2 shows a top view of the cooking appliance 1 according to the disclosure, which illustrates a distance TP between the food product carrier 10 to be inserted into the cooking space 3 and the image recording device 12. This distance TP, which is of course shown here purely as an example, symbolizes a trigger point from which the previously explained measurement and image recording by means of the image recording device 12 begins.

Figure 4:
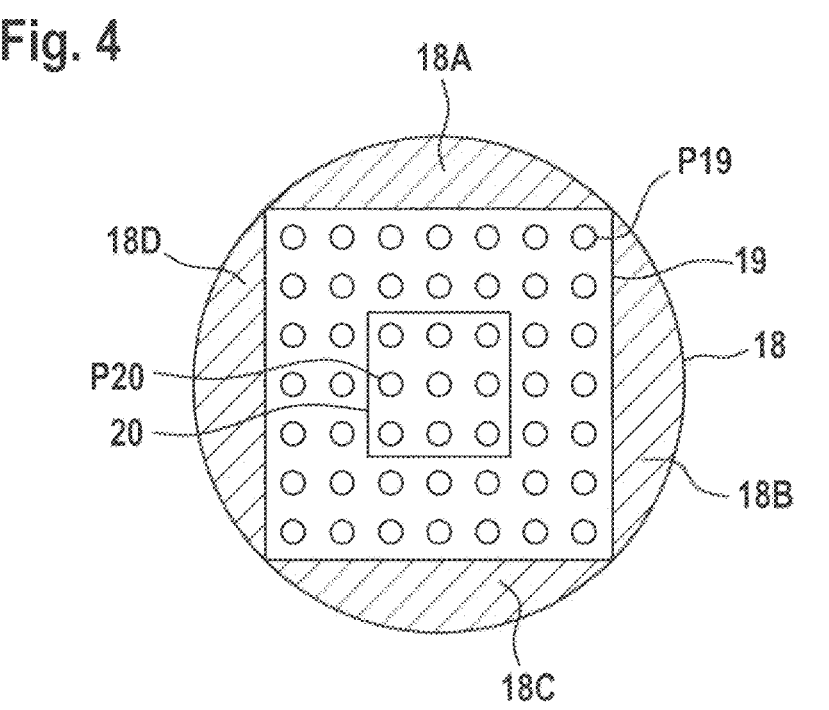

The operation of the second embodiment of the cooking appliance 1 according to the disclosure can be explained with reference to FIG. 4:

The circle 18 symbolizes a standard recording area of the image recording device 12, which is projected by the latter onto an image sensor not shown in detail in the figures. The image sensor includes a sensor area 19, shown as a square in the example, which is smaller than the standard image recording area 18 of the image recording device 12. The resulting excess areas 18A to 18D are cut away by the image sensor so that only the image of the sensor area 19 is fed to the evaluation device 14 with the respectively intended number of pixels P19. Based on the basic data made available to the evaluation device 14, such as in particular the possible insertion positions in the insertion rack 5, it is possible for the latter to determine a partial area 20 on which, for example, the food products A1 or A2 shown in FIG. 3 are arranged in a highly schematically simplified manner. Accordingly, this partial area 20 is the only relevant image area to be analyzed by the evaluation device 14 in order to enable, with sufficiently high image quality, a resulting high quality of product recognition with respect to size, shape, coloring, or other important product characteristics. This significant limitation of the number of pixels P20 to be evaluated results in a significant reduction in the load on the evaluation device 14, which can be seen in the recognition speed. The processing capacity of the evaluation device 14 can thus be designed to be smaller, which reduces the manufacturing costs of the overall system.

The disclosure further relates to a food foodservice device system comprising at least two food foodservice devices. Such a known food foodservice device system may comprise a cooking appliance, in particular in the form of a commercial cooking appliance, and a heat retention appliance. Here, after the end of the cooking process, food product carriers can be removed from the cooking appliance and transferred to the heat retention appliance. In this case, it can typically happen that the food product carriers are slide in and out of the heat retention appliance and sometimes the position is also changed and, furthermore, if several heat retention devices are provided, these are also changed. It should be noted that every food has a maximum retention time in the heat retention appliance. When this has expired, the food should be removed from the heat retention appliance.

For determining the expiry of the maximum permissible dwell time, timers are usually provided on the holding device, which are started by inserting the food product carrier, which is often a tray. Various mechanisms, such as RFID stickers, are known for this start function.

However, investigations carried out during the disclosure have shown that the techniques used to start timers, for example of heat retention devices, are often complex and thus expensive.

It is therefore an object of the present disclosure to provide a food foodservice device system which permits a technically simple and reliable design with at least reduced manufacturing and operating costs.

In accordance with the technical principles of the present disclosure, there is provided a food foodservice device system comprising at least a first foodservice device, which may be, for example, a cooking appliance. This first food-service device comprises a first optical recognition system, which may be provided with a first image recording device, for example in the form of a camera.

Furthermore, at least one second food foodservice device is provided which, as explained above, can be, for example, a heat retention appliance. This second foodservice device comprises a second optical recognition system, which can also be provided with an image recording device, such as a camera. This second optical recognition system is provided for observing an interior of the second foodservice device, the interior having at least one insertion level, but generally a plurality of insertion levels arranged one above the other, for receiving food product carriers (for example in the form of trays). Furthermore, the second foodservice device comprises a timer for recording the expiry of a maximum permissible dwell time of the cooked food brought into the interior. The timer is initiated depending on the cooked food brought in, and the initiated timer is visually displayed on a display of the second treatment device, taking into account its insertion position in the interior of the second foodservice device. Here, the positioning of the timer on a display is to be equated with the real positioning of the food product carrier. As an example, a carrier inserted at the bottom right would also be shown on the display at the top right. This visualization enables the user a clear identification of the running timer and the remaining dwell time of the food in the food foodservice device, respectively.

Advantageously, in addition to the insertion position and the insertion time of the food product carrier, it is also possible to carry out an object detection for the food product on it. In this context, the term "object recognition" describes methods for identifying known objects within an object space by means of optical, acoustic and/or physical recognition methods. Known algorithms use, for example, edge detection or Canny Edge detection and/or Hough Line interpolation in recorded images of the objects. Alternatively, object recognition methods are possible with which recorded images are compared with patterns of known objects (template matching) or object detections are performed with artificial neural networks.

Overall, it can be stated that the food foodservice device system according to the disclosure can be operated in principle with any type of known object recognition.

The dependent claims contain advantageous developments of the disclosure.

Figure 5A:
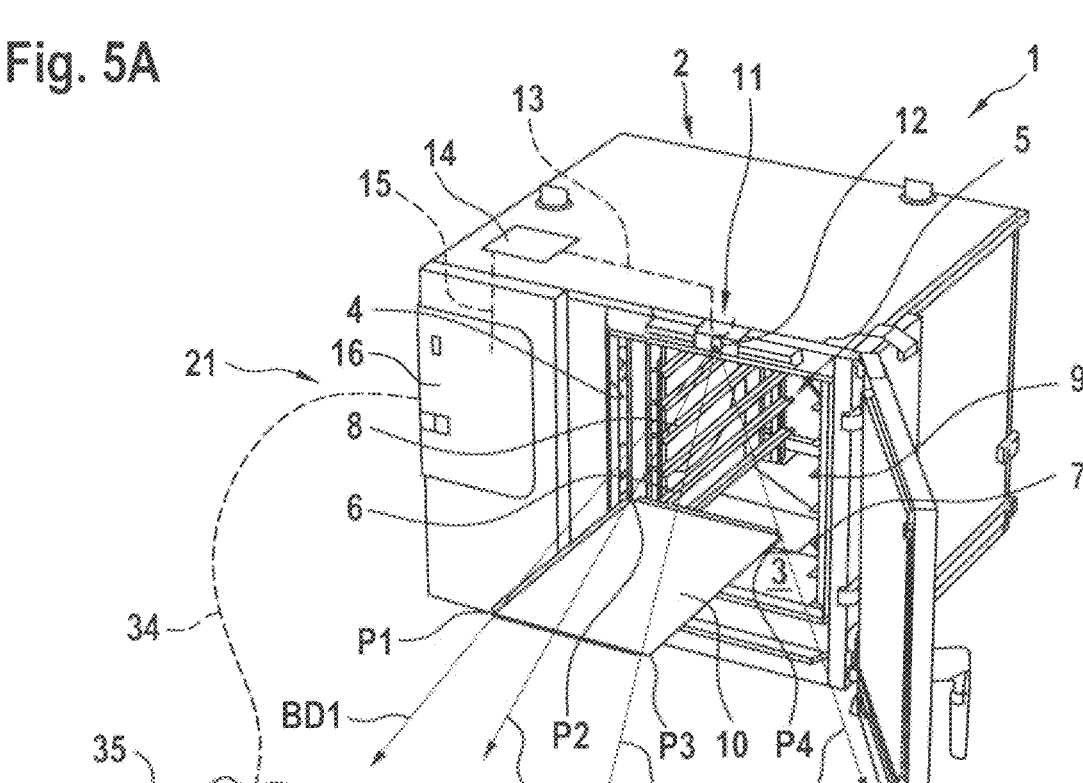
Figure 5B:
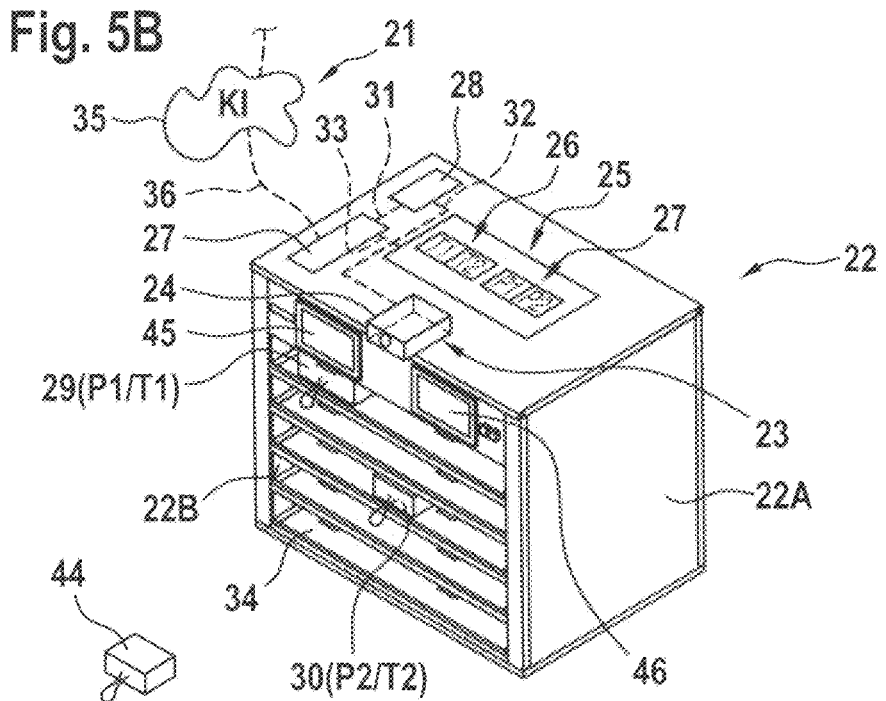

Further details, advantages and features of the disclosure will be apparent from the following description of an exemplary embodiment with reference to FIGS. 5A and 5B.

The combination of FIGS. 5A and 5B illustrates a food foodservice device system according to the disclosure (here-inafter in short referred to as foodservice device system 21).

In the example shown, this foodservice device system 21 includes a first foodservice device 1 which comprises a first optical recognition system 11 with an image recording device 12. FIG. 5A illustrates that the cooking appliance 1 shown in this figure corresponds to that of FIG. 1, so that reference can be made to the description of FIG. 1 with regard to all details. In the illustrated example, the foodser-vice device system 21 comprises a second foodservice device 22, which in this case represents a heat retention appliance. This heat retention appliance 22 comprises a housing 22A with an interior 22B. In this interior space 22B, a plurality of receiving levels for food product carriers is arranged in the example, one of which is identified with the reference number 34. In the embodiment shown, five such insertion levels 34 are provided and arranged one above the other, with two food product carriers 29 and 30 being arranged, purely by way of example, in the uppermost insertion level 34.

The second foodservice device 22 further comprises a timer 26, which is displayable in a display 25 after insertion of the food product carriers 29 and 30. A position indication 27 is further possible on the display 25, so that it results for the example shown in FIG. 5B that the food product carrier 29 can be monitored at a position P1 with an associated timer T1 with respect to the expiry of a maximum permis-sible dwell time. The position P2 and the timer T2 for the second food product carrier 30, are indicated on the display 25.

FIG. 5B illustrates, in addition to the food carriers 29 and 30, a further food product carrier 44 which is still arranged outside the foodservice device 22 and can be inserted at a further position in the interior of the foodservice device 22.

FIG. 5B further illustrates as an alternative display arrangement possibility for two displays 45 and 46, which can also be referred to as display units. With these displays 45 and 46, it is possible to display the positions and the timer on the front of the device.

Like the foodservice device 1, the foodservice device 22 further comprises an optical recognition system 23, in the example with a camera 24 as image recording device, wherein the optical recognition system 23 can be connected via a data line 32 to an evaluation device 28, which with regard to its function can correspond to the evaluation device 14 of the cooking appliance 1. In the foodservice device according to FIG. 5B, the evaluation device 28 is connected via a data line 31 to a device control 27, which in turn can be connected to the display 25 via a data line 33.

A combination of FIGS. 5A and 5B further clarifies that the first foodservice device 1 can be in communication via a further data line 34 with a cloud 35 which, in addition to the otherwise usual servers, can be provided, among others, with an artificial intelligence KI.

In the example shown, the cloud 35 is connected via a data line 36 to the device controller 27 of the second foodservice device 22.

Due to the explained and illustrated constellation of the foodservice devices 1 and 22 and their components, it is possible, after removal of cooked food from the cooking device 1, for example to detect its quality 11 as well as their quantity and arrangement on a food product carrier via the first optical recognition system 11.

This is also possible with the second optical recognition system 23 of the second foodservice device 22 upon inser-tion of a corresponding food product carrier, such as the food product carriers 29 and 30 shown, in order to determine, for example, that the food products inserted into the second foodservice device 22 are those which have been taken from the cooking appliance 1 as the first foodservice device, this preferably being possible solely by determining the local position of the food products on the food product carrier. This is possible even if a displacement of the food products on the food product carrier has occurred within certain limits during the transport from the foodservice device 1 to the foodservice device 22, for which it is possible, due to the connection of the first and second foodservice devices 1 and 22, respectively, to the cloud 35 to use the artificial intelligence KI contained in the cloud 35 for this evaluation. Analysis methods that are available here are, for example, the above-mentioned pattern recognition and edge analysis, which are available to the person skilled in the art in the field of optical recognition.

Figure 6:
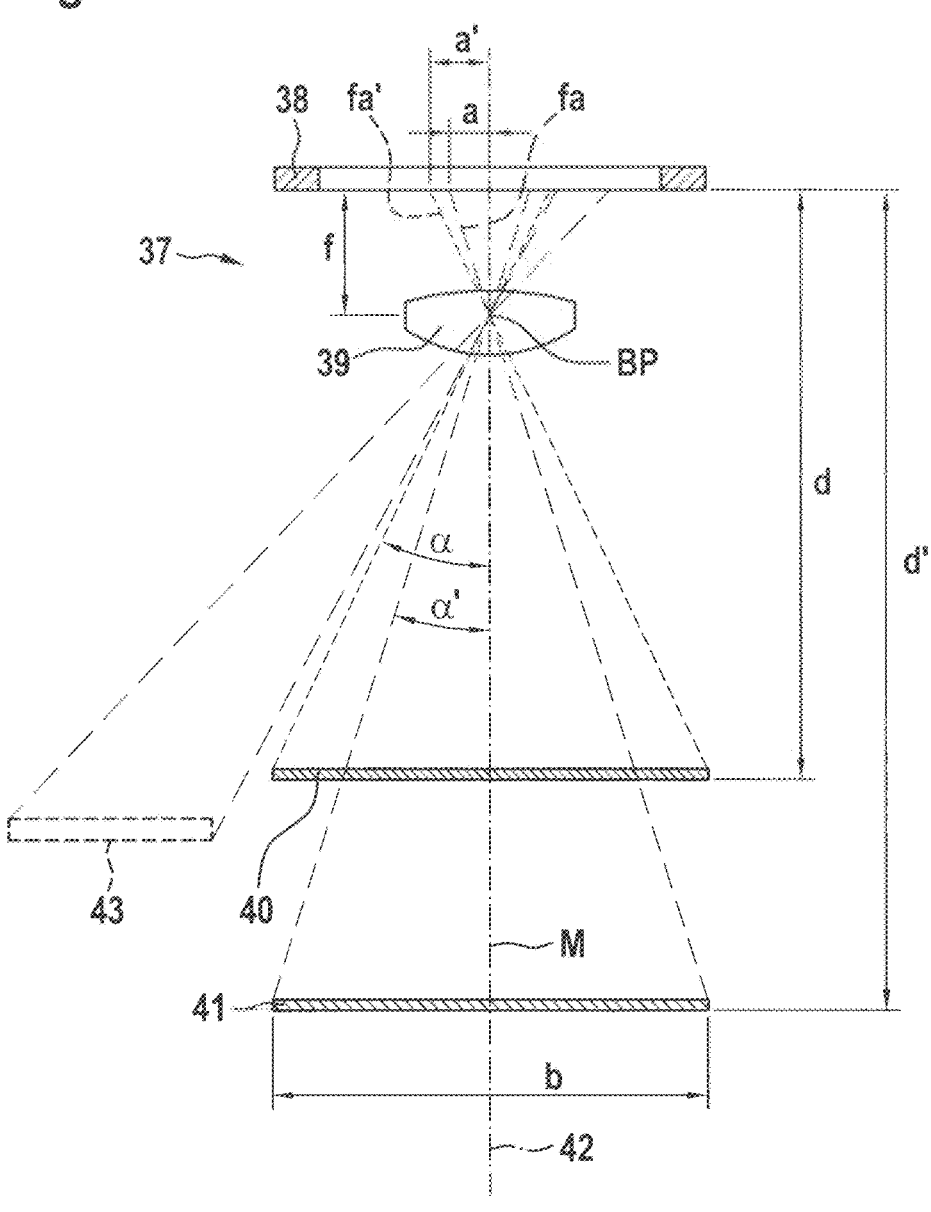

FIG. 6 shows a principal diagram 37 for determining geometric variables which are required for determining the position of a food product carrier in the interior of a food product foodservice device.

In a schematically simplified illustration, an optical sensor 38 (e. g. CMOS) is shown, which interacts with a lens 39 which is arranged at a distance f from the optical sensor 38 corresponding to the focal length of the lens 39.

According to the illustration chosen in FIG. 6, two food product carriers 40 and 41 are illustrated directly above one another below the lens 39 and, in dashed illustration, a further laterally displaced food product carrier 43, as may be the case, for example, in a heat retention appliance 22 shown in FIG. 5B.

As FIG. 6 further illustrates, the course of a connecting line fa' that runs from the optical sensor 38 through the focal point BP of the lens 39 and ends at an end point of the food product carrier 40 results in a corresponding distance a'. A corresponding distance a results from the course of the line fa ending at an end point of the second food carrier 41. The lines fa' and fa mirrored to the center line M passing through the focal point BP result in the angles $\alpha'$ and $\alpha$. Based on these geometric values, the respective distance d or d' to the optical sensor can be calculated in a trigonometric manner via the known width b of the food product carriers 40 and 41.

The same applies to a lateral offset symbolized by the dashed food product carrier 43.

FIG. 7 shows a top view of a further food product carrier 47 filled with food product 48. This illustration is intended to clarify that when filling the food product carrier 47/container 45 with a food product 48, a unique identification results, since the arrangement of the individual parts of the food product 48 resulting from the filling results in a kind of "fingerprint" which can be identified by means of the object recognition techniques explained above.

FIG. 8 is a block diagram depicting system 800 according to the present disclosure with first foodservice device 836 and second foodservice device 837. System 800 includes a computer 805 coupled to a network 820, e.g., the Internet.

Computer 805 includes a user interface 810, a processor 815, and a memory 825. Computer 805 may be implemented on a general-purpose microcomputer. Although computer 805 is represented herein as a standalone device, it is not limited to such, but instead can be coupled to other devices (not shown) via network 820.

Processor 815 is configured of logic circuitry that responds to and executes instructions.

Memory 825 stores data and instructions for controlling the operation of processor 815. Memory 825 may be implemented in a random access memory (RAM), a hard drive, a read only memory (ROM), or a combination thereof. One of the components of memory 825 is a program module 830.

Program module 830 contains instructions for controlling processor 815 to execute the methods described herein. For example, as a result of execution of program module 830, processor 815. The term "module" is used herein to denote a functional operation that may be embodied either as a stand-alone component or as an integrated configuration of plurality of sub-ordinate components. Thus, program module 830 may be implemented as a single module or as a plurality of modules that operate in cooperation with one another. Moreover, although program module 830 is described herein as being installed in memory 825, and therefore being implemented in software, it could be implemented in any of hardware (e.g., electronic circuitry), firmware, software, or a combination thereof.

User interface 810 includes an input device, such as a keyboard, touch panel or speech recognition subsystem, for enabling a user to communicate information and command selections to processor 815. User interface 810 also includes an output device such as a display, loudspeaker, or a printer. A cursor control such as a mouse, track-ball, or joystick, allows the user to manipulate a cursor on the display for communicating additional information and command selections to processor 815.

Processor 815 outputs, to user interface 810, a result of an execution of the methods described herein. Alternatively, processor 815 could direct the output to a remote device (not shown) via network 820.

While program module 830 is indicated as already loaded into memory 825, it may be configured on a storage medium 835 for subsequent loading into memory 825. Storage medium 835 can be any conventional storage medium that stores program module 830 thereon in tangible form. Examples of storage medium 835 include a floppy disk, a compact disk, a magnetic tape, a read only memory, an optical storage media, universal serial bus (USB) flash drive, a digital versatile disc, or a zip drive. Alternatively, storage medium 835 can be a random access memory, or other type of electronic storage, located on a remote storage system and coupled to computer 805 via network 820.

System 800 is by laterally connected to first foodservice device 836 and second treatment application 837 via network 820. First foodservice device 836 can be either a cooking appliance or a heat retention or holding cabinet which comprises a timer 845, display 846, evaluation device 842, position indicator 803, and a first optical recognition system (ORS) 839. ORS 839 comprises an image recording device (IRD) 801. Similarly, second foodservice device 837 can be either a cooking appliance or a heat retention or holding cabinet which comprises a timer 838, display 840, evaluation device 841, position indicator 844 and second ORS 843. ORS 844 comprises an image recording device 802.

FIG. 9 is a front planar view of first foodservice device 836 according to the present disclosure, having a user interface 810 and processor 815 on controller 16. In addition, FIG. 9 comprises a network connection or ethernet or internet (NWA), data cable (DK), foodservice device (GG), foodservice equipment control (GS), antenna for WLAN (A), determination unit (BE), transmission unit (UE), and display unit (MMI). Furthermore, food product 901 disposed on food product carrier 10 are viewable through glass 902 in door 903.

FIG. 10 is a pair of heat retention or holding cabinet devices which communicate with each other when at least one food product carrier or tray 29, 30 is moved from a first foodservice device 22-1 to a second foodservice device 22-2. The first AI 35a of first foodservice device 22-1 is responsible to ensure that the data transmitted from the IRD/ORS therein is processed to generate key information which is then communicated to second AI 35b of second foodservice device 22-2. Second AI 35b of second foodservice device 22-2 receives and stores the key information from foodservice device 22-1.

FIG. 11 is a logic diagram according to the present disclosure which determines the location of a food product carrier 10 by either (1) a fixed focal length or an image recording device, and/or (2) the edge length of the food product carrier. FIG. 11 starts by activating 1101 an optical recognition system (ORS) 839 or 843. It then determines 1102 if a food product carrier 10 is detected by either ORS 839, 843. If no carrier 10 is detected, then it returns to step 1101. If, however, carrier 10 is detected, then it activates 1103 an image recording device (IRD) 801, 802 to record a cooking or food holding space or chamber image with food product carrier 10 disposed therein. Thereafter, ORS 839, 843 transmits 1104 the recorded cooking space or chamber image from IRD 801, 802 to an evaluation device 842, 841, respectively. Evaluation device 842, 841 then determines the location/position of food product carrier 10 in the cooking space or chamber. Alternatively, evaluation device 842, 841 determines 1105 the spatial positioning within first or second foodservice device 836, 837 by either (1) fixed focal length of the IRD, and/or (2) the edge length of food product carrier 10.

FIG. 12 is a logic diagram according to the present disclosure which determines the position, i.e., insertion level, of the food product on carrier 10 by comparing the recorded food product image from the image recording device to a previously stored image, shape and/or dimension of a known food product. FIG. 12 starts by activating 1201 an optical recognition system (ORS) 839 or 843. It then determines 1202 if a food product carrier 10 is detected by either ORS 839, 843. If no carrier 10 is detected, then it returns to step 1201. If, however, carrier 10 is detected, then it determines 1203 if a food product id detected on food carrier 10 by ORS 839, 843. If no food product is detected on carrier 10, then it returns to step 1202. However, if food product is detected on carrier 10, then it activates 1204 an image device (IRD) 801, 802 to record an image of the food product within the cooking space or chamber. Thereafter, ORS 839, 843 transmits 1205 the recorded food product image captured by IRD 801, 802 to an evaluation device 842, 841, respectively. Evaluation device 842, 841 then determines 1206 the position or location, i.e., insertion level, of the food product on carrier 10 by comparing the recorded food product image from IRD 801, 802 to the previously stored form, shape and/or dimension of a known food product.

FIG. 13 is logic diagram according to the present disclosure which determines the occupancy of the respective rack levels by comparing the recorded number of insert rail pairs without a carrier disposed therebetween to the maximum number of insert rail pairs in the cooking or holding space cabinet. FIG. 13 starts by activating an optional recognition system (ORS) 1301. Thereafter, the ORS 839, 843 detects 1302 is there are any insert rail pairs in the cooking or food space or cabinet which do not have a food product carrier 10 disposed therebetween. If no, then it returns to step 1301. If, however, it determines that there are insert rail pairs without any carriers 10, then it activate 1303 an image recording device 801, 802 to record the number of insert rail pairs without a food product carrier 10 and transmits 1304 the recorded image to evaluations device 842, 841. Evaluation device 842, 841 then determines the occupancy of the respective rack levels 1305 by comparing the recorded number of insert rail pairs without a food product carrier to the maximum number of insert rail pairs in the food space or chamber.

FIG. 14 is a logic diagram according to the present disclosure which determined via the evaluation device the image section of the food product carrier within the food space or cabinet image to be analyzed from the food space or holding image data recorded by the image recording device and cutting away all image areas that extend beyond the image section to be analyzed. FIG. 14 starts by activating 1401 an optical recognition system (ORS) 839, 843. System 800 then determines 1402 if ORS 839, 843 detected a food product carrier 10. If no, then it returns to step 1401. However, if a food product carrier 10 is detected by ORS 839, 843, then the system activates 1403 image recording device (IRD) 801, 802 to record a food space or cabinet image with a food product carrier 10 disposed therein. The system then transmits 1404 the recorded food space or cabinet image from IRD 801, 802 to evaluation device 842, 841, respectively. Evaluation device 842, 841 thereafter determines 1405 the image section of food product carrier 10 within the recorded food space or cabinet image to be analyzed from the food space or cabinet image data recorded by IRD 801, 802 and cutting away all image areas that extend beyond the image section to be analyzed.

FIGS. 15A and B is a logic diagram according to the present disclosure which determines (a) the position, i.e., insertion level, of the food product on the carrier 10 and activates a timer 26, 845 that is displayed 25, 846 on a user interface of first foodservice device 22-1, 836, (b) upon detecting that food product carrier 10 is removed from first foodservice device 22-1, 836, transmitting key information pertaining to food product carrier 10 from first foodservice device 22-1, 836 to second foodservice device 22-2, 837, including, but not limited to, food type, remaining count down time, shape/pattern of food time, etc., and (c) determining the position, i.e., insertion level, of food product on the carrier 10 by comparing the recorded food product image from the image recording device 801, 802 to the previously stored form, shape and/or dimensions of a known food product and activate a remaining timer if the key information transmitted from first foodservice device 22-1, 836 matches the key information detected in second foodservice device 22-2, 837. The first foodservice device can be either a cooking appliance or a heat retention or holding cabinet, and the second foodservice device can be a heat retention or holding cabinet.

FIGS. 15A and B is a logic diagram, wherein the system 800 initially activates 1501 optical recognition systems 839 and 843 for first and second foodservice devices 836, 837. System 800 checks to see if a food product carrier 10 is detected 1502 in first foodservice device 836 by ORS 839. If not, then the system return to step 1501. However, if carrier 10 is detected in first foodservice device 836, then the system checks to see if a food product is detected 1503 on carrier 10 by ORS 839 of first foodservice device 836. If no, then the system returns to step 1502. If yes, then the system activates 1504 image recording device (IRD) 801 for the purpose of recording an image of the detected food product within a food space or cabinet. The system then transmits 1505 the recorded image from IRD 801 to evaluation device 842. Evaluation device 842 determines 1506 the position, i.e., insertion level, of the food product on carrier 10 by comparing the recorded food product image from IRD 801 to the previously stored form, shape and/or dimension of a known food product and activates timer 845 that is shown in display 846 on first foodservice device 836.

System 800 then checks to see if food product carrier 10 has been removed from the food space or cabinet of first foodservice device 836 and detected 1507 by ORS 839. If no, then it returns to step 1506. If yes, then the system transmits 1508 key information of the food product and carrier 10 from first foodservice device 836 to second foodservice device 837, e.g., food type, remaining count down time from timer 845, shape/pattern of food time inside carrier 10, etc.

System 800 thereafter checks 1509 to see if food product carrier 10 has been detected by ORS 843 of second food-service device 837. If detected, then system 800 check 1510 to see if the food product is detected on carrier 10 by ORS 843. If no, then the system returns to step 1509. If yes, system 800 activates 1511 image recording device 802 to record an image of the detected food product within a food space or cabinet and compares with key information received from first foodservice device 836. Thereafter, system 800 determines 1512 the position, i.e., insertion level, of the food product on carrier 10 by comparing the recorded food product image from IRD 802 to the previously stored form, shape and/or dimension of a known food product and activates a remaining timer 838 that is on display 840 of second foodservice device 837 if the key information that was received from first foodservice device 836 is matching.

In addition to the foregoing written disclosure of the disclosure, reference is hereby made explicitly to the graphic representation of the disclosure in FIGS. 1 to 15B to complement the disclosure.

REFERENCE SIGNS

1 cooking appliance
2 Housing
3 cooking space
4 cooking space opening
5 insert rack
6, 7, 8, 9 pairs of insert rails
10, 10A, 10B food product carrier
11 optical recognition system
12 image recording device, in particular in the form of a camera, preferably with a fixed focal length
13 first data line
14 evaluation device
15 second data line
16 appliance control/appliance regulation
17 cooking space door
18 standard image recording area of the image recording device 12
18A to 18D excess area
19 sensor area
20 partial area/partial area relevant for image recognition
21 foodservice device system
22 foodservice devices
22A Housing
22B Interior
23 second optical recognition system
24 image recording device, in particular camera
25 Display
26 Timer
27 position indication
28 evaluation device
29, 30 food product carrier
31, 32, 33 data lines

34 insertion level
34', 36 data lines
35 Cloud
37 principal diagram
38 optical sensor
39 Lens
40, 41, 43 food product carrier
44, 47 food product carrier
45, 46 display units (displays)
48 food product
F Distance
fa'
fa' connecting line
a' Distance
a Distance
fa Line
fa' and fa mirrored lines
BP Focus
M center line
$\alpha'$ and $\alpha$ Angle
b Width
d and d', respectively Distance
KI artificial intelligence
P19, P20 Pixel
H1, H2 height or distances between the image recording device 12 and food product carriers 10A, 10B for symbolizing the insertion levels
BD1 to BD4 image data/cooking space image data
A1, A2 food products
P1 to P4 corner points of the food product carriers 10, 10A, 10B
X1, X2 edge length of the food product carriers 10A, 10B, wherein due to the distance H1 or H2 results that the detected edge length X1 is greater than X2
TP Trigger point

What is claimed is:

1. A method for transferring a food product carrier between at least a first foodservice device and a second foodservice device, which method comprises:

activating a first optical recognition system for a first foodservice device;

detecting by the first optical recognition system if a food product carrier is in the first foodservice device;

if the first optical recognition system detects that the food product carrier is in the first foodservice device, detecting by the first optical recognition system if a food product is on the food product carrier;

if the food product is detected on the food product carrier, activating an image recording device to record an image of the detected food product within an interior space of the first foodservice device;

transmitting the recorded food product image from the image recording device to a first evaluation device;

determining the position of the food product on the food product carrier by comparing the recorded food product image to a previously stored known food product;

activating a first timer regarding the food product in the first foodservice device;

detecting if the food product carrier is removed from the first foodservice device;

if the food product carrier is removed from the first foodservice device, transmitting information pertaining to the food product and the food product carrier from the first foodservice device to the second foodservice device;

detecting by a second optical recognition system if the food product carrier has been received by the second foodservice device;

if the food product carrier has been received by the second foodservice device, detecting if the food product is on the food product carrier which was detected by the second optical recognition system;

activating an image recording device to record an image of the detected food product on the food product carrier in the second foodservice device;

comparing the information transmitted from the first foodservice device with information received by the second foodservice device;

determining the position of the food product on the food product carrier by comparing the recorded food product image from a previously stored food product; and activating a second timer on the second foodservice device if the information that was transmitted from first foodservice device matches the information received by the second foodservice device.

2. A foodservice system comprising:

a first foodservice device including a first optical recognition system with an image recording device;

a second foodservice device including a second optical recognition system with an image recording device for observing an interior space of a housing of the second foodservice device, the interior space having at least one insertion level for receiving food product carriers, and a first timer and a first evaluation device, each associated with the first foodservice device;

a second timer associated with the second foodservice device;

a processor configured to execute instructions that cause the foodservice system to perform the method of claim 1.

3. The foodservice system according to claim 2, wherein a first food product arrangement pattern on the food product carrier and a second food product arrangement pattern on the food product carrier can be determined by the optical recognition systems of the first foodservice device and the second foodservice device.

4. The foodservice system according to claim 3, wherein, by an image comparison between the first food product arrangement pattern and the second food product arrangement pattern, it can be determined by image recognition methods whether the food products taken out from the first foodservice device are those that are introduced in the second foodservice device.

5. The foodservice system according to claim 2, wherein the first foodservice device is in data connection with the second foodservice device via a cloud comprising an artificial intelligence.

6. The foodservice system according to claim 5, wherein an appliance control of the first foodservice device is data-connected to an appliance control of the second foodservice device via the cloud.

7. The foodservice system according to claim 2, wherein the second foodservice device further comprises an evaluation device.

8. The foodservice system according to claim 2, wherein the first foodservice device is a cooking device, and the second foodservice device is a heat retention or holding devise.

9. The foodservice system according to claim 2, wherein the first foodservice device is a heat retention or holding and the second foodservice device is also a heat retention or holding device.

10. The foodservice system according to claim 2, wherein the first and the second foodservice devices are each cooking and/or holding devices.

* * * * *